(12) United States Patent
Ahn et al.

(10) Patent No.: US 12,738,485 B2
(45) Date of Patent: Sep. 15, 2026

(54) NICKEL-BASED ACTIVE MATERIAL, POSITIVE ELECTRODE INCLUDING THE SAME, AND LITHIUM SECONDARY BATTERY EMPLOYING THE POSITIVE ELECTRODE

(71) Applicant: Samsung SDI Co., Ltd., Yongin-si (KR)

(72) Inventors: Kiyong Ahn, Yongin-si (KR); Taehee Kwak, Yongin-si (KR); Minkyu Kim, Yongin-si (KR); Naoyuki Hase, Yongin-si (KR); Jeuk Ha, Yongin-si (KR); Seonyoung Kwon, Yongin-si (KR); Yumi Song, Yongin-si (KR); Eunok Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 328 days.

(21) Appl. No.: 17/452,286

(22) Filed: Oct. 26, 2021

(65) Prior Publication Data

US 2022/0140338 A1 May 5, 2022

(30) Foreign Application Priority Data

Oct. 29, 2020 (KR) ........................ 10-2020-0142521

(51) Int. Cl.
*H01M 4/525* (2010.01)
*H01M 4/02* (2006.01)
*H01M 10/0525* (2010.01)

(52) U.S. Cl.
CPC ....... *H01M 4/525* (2013.01); *H01M 10/0525* (2013.01); *H01M 2004/021* (2013.01); *H01M 2004/028* (2013.01)

(58) Field of Classification Search
CPC ............. H01M 4/525; H01M 10/0525; H01M 2004/021; H01M 2004/028
See application file for complete search history.

(56) References Cited

U.S. PATENT DOCUMENTS 9,287,559 B2 3/2016 Hong et al.
10,193,150 B2 1/2019 Feng et al.
(Continued)

FOREIGN PATENT DOCUMENTS

CN 109786729 A 5/2019
EP 3890060 A1 10/2021
(Continued)

OTHER PUBLICATIONS

Notice of Allowance issued Apr. 19, 2022, in corresponding KR Patent Application No. 10-2020-0142521 (3 pages).
(Continued)

*Primary Examiner* — Ula C Ruddock
*Assistant Examiner* — Olivia Mason Melfi
(74) *Attorney, Agent, or Firm* — Womble Bond Dickinson (US) LLP

(57) ABSTRACT

A nickel-based active material, a positive electrode including the same, and a lithium secondary battery including the positive electrode, a negative electrode, and an electrolyte between the positive electrode and the negative electrode are provided. The nickel-based active material includes 80 mol % or more of nickel with respect to the metal elements excluding lithium, and the nickel-based active material includes: i) large secondary particles having a size in a range of 10 μm to 20 μm and including aggregates of primary particles having a size of 1 μm or less; ii) large crystal particles including primary particles having a size in a range of 1 μm to 5 μm; and iii) small secondary particles having
(Continued)

a size in a range of 1 μm to 7 μm and including aggregates of primary particles having a size of 1 μm or less.

17 Claims, 13 Drawing Sheets

(56) References Cited

U.S. PATENT DOCUMENTS

| | | | | |
|---|---|---|---|---|
| 11,063,250 | B2 | 7/2021 | Choi et al. | |
| 2013/0108921 | A1* | 5/2013 | Kase | C01G 53/50 429/211 |
| 2015/0010819 | A1* | 1/2015 | Lee | H01M 4/505 429/223 |
| 2017/0054147 | A1* | 2/2017 | Yokoyama | H01M 4/36 |
| 2017/0155139 | A1* | 6/2017 | Feng | H01M 4/525 |
| 2019/0148717 | A1* | 5/2019 | Choi | H01M 10/052 429/209 |
| 2020/0185714 | A1 | 6/2020 | Han et al. | |
| 2020/0235381 | A1 | 7/2020 | Park et al. | |

FOREIGN PATENT DOCUMENTS

| | | | | | |
|---|---|---|---|---|---|
| JP | 2010070427 | A | * | 4/2010 | |
| KR | 10-2013-0135172 | A | | 12/2013 | |
| KR | 10-2015-0006283 | A | | 1/2015 | |
| KR | 10-2019-0041715 | A | | 4/2019 | |
| KR | 10-2019-0043855 | A | | 4/2019 | |
| KR | 10-2019-0078498 | A | | 7/2019 | |
| KR | 10-2020-0070649 | A | | 6/2020 | |
| WO | WO-2019120973 | A1 | * | 6/2019 | C01G 53/42 |
| WO | 2020-110260 | A1 | | 6/2020 | |
| WO | WO-2020134781 | A1 | * | 7/2020 | C01G 53/42 |

OTHER PUBLICATIONS

Extended European Search Report issued Apr. 20, 2022, in corresponding EP Patent Application No. 21203826.9 (6 pages).

Office Action issued by the Chinese Patent Office for Application No. 202111234675.9, mailed Dec. 22, 2023, with translation, total of 15 pages.

Barrett, Elliott P., et al., *The Determination of Pore Volume and Area Distributions in Porous Substances. I. Computations from Nitrogen Isotherms,* 73 J. Am. Chem. Soc. 373-380, Jan. 1, 1951 (8 pages).

* cited by examiner

NICKEL-BASED ACTIVE MATERIAL, POSITIVE ELECTRODE INCLUDING THE SAME, AND LITHIUM SECONDARY BATTERY EMPLOYING THE POSITIVE ELECTRODE

CROSS-REFERENCE TO RELATED APPLICATION

This application claims priority to and the benefit of Korean Patent Application No. 10-2020-0142521, filed on Oct. 29, 2020 in the Korean Intellectual Property Office, the entire content of which is hereby incorporated by reference.

BACKGROUND

1. Field

One or more aspects of embodiments of the present disclosure relate to a nickel-based active material, a positive electrode including the same, and a lithium secondary battery employing the positive electrode.

2. Description of Related Art

In order to meet the trend toward compact, high-performance devices, it is becoming important to manufacture lithium secondary batteries that are small, lightweight and have high energy density. In addition, the stability of lithium secondary batteries under high-capacity, high-temperature, and high-voltage conditions has become an important factor for applications in electric vehicles and/or the like.

Various positive electrode active materials are currently under investigation to achieve a lithium secondary battery that is suitable for the purposes described above. The positive electrode active material plays an important role in the capacity and cycle characteristics of a lithium secondary battery.

A nickel-based active material including a large amount (e.g., proportion) of nickel is utilized as a positive electrode active material having excellent capacity characteristics. However, the large amount of nickel may be associated with deteriorated cycle characteristics, and thus improvements in this regard are desired.

SUMMARY

One or more aspects of embodiments of the present disclosure are directed toward a nickel-based active material providing reduced cell resistance while having an excellent or desired capacity characteristic.

One or more aspects of embodiments of the present disclosure are directed toward a positive electrode including the nickel-based active material.

One or more aspects of embodiments of the present disclosure are directed toward a positive electrode having an improved cycle characteristic by employing the positive electrode.

Additional aspects will be set forth in part in the description which follows and, in part, will be apparent from the description, or may be learned by practice of the presented embodiments of the disclosure.

One or more embodiments of the present disclosure provide a nickel-based active material including 80 mol % or greater of nickel with respect to the metal elements excluding lithium, wherein:

the nickel-based active material includes: i) large secondary particles having a size in a range of 10 μm to 20 μm, each including aggregates of primary particles having a size of 1 μm or less; ii) large crystal particles including primary particles having a size in a range of 1 μm to 5 μm; and iii) small secondary particles having a size in a range of 1 μm to 7 μm, each including aggregates of primary particles having a size of 1 μm or less.

One or more embodiments of the present disclosure provide a positive electrode including the nickel-based active material.

One or more embodiments of the present disclosure provide a lithium secondary battery including a positive electrode, a negative electrode, and an electrolyte located therebetween.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Figure 1:
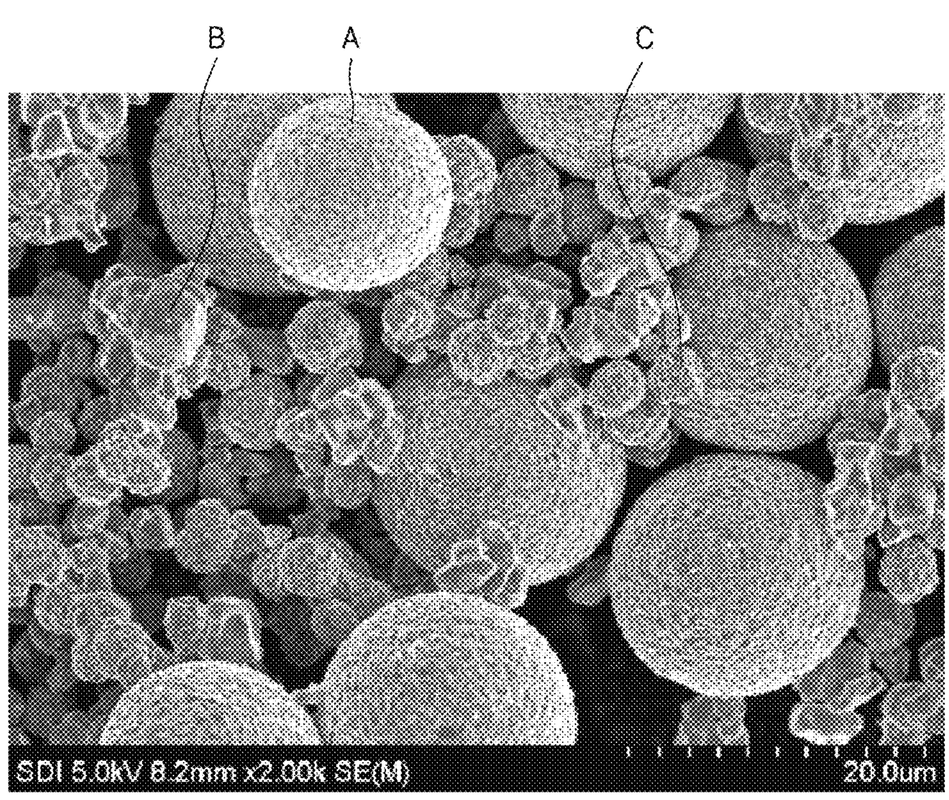
FIG. 1 is a scanning electron microscope (SEM) image of a positive electrode active material prepared in Example 1.

Reference will now be made in more detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are merely described, by referring to the drawings, to explain aspects of the present description. As utilized herein, the term "and/or" includes any and all combinations of one or more of the associated listed items. Expressions such as "at least one of," "one of," and "selected from," when preceding a list of elements, modify the entire list of elements and do not modify the individual elements of the list.

As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof. Further, the use of "may" when describing embodiments of the present disclosure refers to "one or more embodiments of the present disclosure".

It will be understood that when an element is referred to as being "on," "connected to," or "coupled to" another element, it may be directly on, connected, or coupled to the other element or one or more intervening elements may also be present. When an element is referred to as being "directly on," "directly connected to," or "directly coupled to" another element, there are no intervening elements present.

Hereinafter, a nickel-based active material according to one or more embodiments, a method of preparing the same, a positive electrode including the same, and a lithium secondary battery including the positive electrode, will now be described in more detail.

A nickel-based active material including 80 mol % or greater of nickel among metal elements excluding lithium, wherein the nickel-based active material includes: i) large secondary particles having a size in a range of 10 μm to 20 μm and each including aggregates of primary particles having a size of 1 μm or less; ii) large crystal particles including primary particles having a size in a range of 1 μm to 5 μm; and iii) small secondary particles having a size in a range of 1 μm to 7 μm and each including aggregates of primary particles having a size of 1 μm or less.

According to an embodiment, the large crystal particle may be a one-body primary particle or monolithic particle (e.g., that is not aggregated to form a secondary particle). According to another embodiment, the large crystal particle may be an aggregate of primary particles (e.g., may be a secondary particle). In some embodiments, the term "large crystal particle" may indicate a primary particle crystal size that is larger than that of each of the primary particles included in the small secondary particle.

In the present specification, the term "one-body particle" refers to a particle structure in which each particle is present in an independent phase without morphologically aggregated particles. An alternate particle structure to the one-body particle may include a structure in which small particles (primary particles) are physically and/or chemically aggregated to form large particles (secondary particles). In the present specification, the term "monolith" may refer to a morphology where particles are separated from each other and/or dispersed so that each particle has an independent and/or discrete (e.g., one) phase, as opposed to a morphology where multiple crystalline particles are aggregated. In some embodiments, the particle structure may have a morphology in which not greater than 10 particles are aggregated together.

In the nickel-based active material, the amount of nickel may be 80 mol % or greater, 80 mol % to 95 mol %, 85 mol % to 92 mol %, or 88 mol % to 90 mol % with respect to a total amount of 100 mol % of the non-lithium metals in the positive active material (e.g., the metals in the metal-oxide layer, excluding lithium).

As a positive electrode active material having an improved capacity characteristic, a nickel-based active material containing a large amount of nickel may be utilized. The nickel-based active material containing a large amount of nickel may have excellent capacity characteristic but deteriorated cycle characteristics, and, in this regard, improvements are desired.

To overcome the above-described problems, attempts have been made to utilize a mixture of nickel-based active materials having different sizes, but cycle life improvements have not been sufficient.

In the present disclosure, in order to obtain a lithium secondary battery having an improved cycle life, a mixture of a large-diameter particle nickel-based active material and a small-diameter particle (e.g., small secondary particle) nickel-based active material is utilized as a positive electrode active material, and the small-diameter particle nickel-based active material is diversified (e.g., a nickel-based active material having particles with a comparatively smaller diameter is provided as a mixture and/or in one or more forms). By varying particle types (e.g., morphology and/or size) and nickel content of the small-diameter particle nickel-based active material, a non-uniform electrochemical reaction between the large-diameter particle nickel-based active material and the small-diameter particle nickel-based active material may become substantially uniform, thereby achieving structural stability while suppressing or reducing gas generation. By employing such a positive electrode including such a nickel-based active material, a lithium secondary battery having improved cycle life characteristics at room temperature and high temperature may be achieved.

The nickel-based active material according to an embodiment includes large secondary particles, large crystal particles, and small secondary particles, and non-uniformity in the electrochemical reactions between the large-diameter particle nickel-based active material and the small-diameter particle nickel-based active material may be lessened by controlling or selecting particle sizes and types (e.g., morphology) of the three types (kinds) of particles, thereby preventing or reducing an increase in the resistance due to non-uniformity.

In the present specification, the term "size" refers to a diameter, for example when particles of a lithium-based active material are spherical. In some embodiments, when particles of the lithium-based active material are not spherical, the term "size" may indicate a long-axis length. The particle diameter may be an average particle diameter, and the long-axis length may be an average long-axis length. For example, the particle diameter may be a median particle size or a D50 particle size.

The average particle diameter may be measured utilizing a particle size distribution (PSD) meter or through scanning electron microscopy (SEM). The long-axis length may be measured through SEM.

The term "D50 particle size" indicates that 50% of the particles in a volume distribution of particle sizes have a larger particle size and 50% of the particles in the volume distribution of particle sizes have a smaller particle size, compared to the described size value. When the particle is spherical, the term "average particle diameter" of the particles may be, a median diameter (D50). For example, "D50" refers to a particle diameter corresponding to a volume of 50% with respect to a cumulative particle distribution ordered from smallest size to largest size. The distribution may be accumulated in the order of the smallest particle size to the largest particle size. In the curve, when the total number of particles is (e.g., normalized to) 100%, it means the value of the particle diameter corresponding to 50% from the smallest particle.

The large secondary particles may be formed as secondary particles having an average particle size of 10 μm to 20 μm by aggregating primary particles having an average particle size of 1 μm or less, and the small secondary particles may be formed as secondary particles having an average particle size of 1 μm to 7 μm by aggregating primary particles having a size of 1 μm or less. In some embodiments, unlike the large secondary particles, the large crystal particles may have a one-body (e.g., monolith) shape or form, for example by increasing the sizes of the primary particles. In some embodiments, the large crystal particles may have a secondary particle form, that is, may be aggregates of primary particles.

In the nickel-based active material according to an embodiment, the large crystal particles may each have a one body particle shape obtained by, for example, increasing sizes of primary particles (e.g., forming primary particles having a relative large or increased size). As the large crystal particles have a one-body particle structure, the movement path length for lithium ions to reach the surface of the nickel-based active material (e.g., when diffusing from the interior of the particle) increases. Accordingly, surface impurities may be reduced or minimized, the surface impurities being formed due to adsorption of $Li_2CO_3$ or LiOH, which may be produced on a surface of the nickel-based active material by a reaction between the lithium ions migrated to the surface of the nickel-based active material and $CO_2$ or moisture in the air. In some embodiments, it may be possible to avoid probable problems (e.g., reduce the risk or occurrence of problems) caused by such surface impurities, for example, reduction in battery capacity, increased interface resistance due to inhibited movement of lithium ions, gas generation due to decomposition of impurities, and resulting battery swelling. Consequently, when the nickel-based active material is applied to a battery, the battery may have improved capacity characteristics, high-temperature stability, and charge/discharge characteristic.

According to an embodiment, the large secondary particles may have the highest amount (e.g., concentration or proportion) of nickel, as compared to the large crystal particles and the small secondary particles. For example, the amount of nickel may be reduced in the order of the large secondary particles, the large crystal particles, and the small secondary particles.

According to another embodiment, the amount of nickel contained in the large crystal particles may be equal to or smaller than the amount of nickel contained in the small secondary particles. According to still another embodiment, the amount of nickel contained in the large crystal particles may be larger than the amount of nickel contained in the small secondary particles. The amount of nickel contained in the large secondary particles, as described above, may be larger than the amount of nickel contained in the small secondary particles and/or may be larger than the amount of nickel contained in the large crystal particles. The amount of nickel contained in the large secondary particles may be 90 mol % to 99 mol % based on 100 mol % of the total metal elements excluding lithium of the nickel-based active material, and the amount of nickel contained in the small secondary particles may be 80 mol % to 95 mol % based on 100 mol % of the total metal elements excluding lithium of the nickel-based active material.

The amount of nickel contained in the large crystal particles may be 80 mol % to 95 mol % based on 100 mol % of the total metal elements excluding lithium of the nickel-based active material. The nickel-based active material may have enhanced lifetime characteristic as well as an increased mixture density and/or high output performance by controlling or selecting the amount of nickel contained in the large crystal particles to be larger than the amount of nickel contained in the small secondary particles.

A difference in the nickel amount between the large secondary particles and the large crystal particles and/or a difference in the nickel amount between the large secondary particles and the small secondary particles may be, for example, 19 mol % or less, 15 mol % or less, 10 mol % or less, 1 mol % to 10 mol %, 1 mol % to 5 mol %, or 1 mol % to 4 mol %.

According to still another embodiment, the primary particles contained in the large crystal particles may have a larger average particle diameter than those contained in the small secondary particles.

The average particle diameters of the primary particles contained in the large secondary particles, the large crystal particles, and/or the small secondary particles, which constitute the nickel-based active material, may each be identified utilizing SEM. For example, the average particle diameter of the primary particles may be obtained from an average of particle diameters of 10 to 30 primary particles.

In the nickel-based active material according to an embodiment, the primary particles in the large secondary particles may have a size of 0.01 μm to 1 μm, 0.02 μm to 0.8 μm, 0.03 μm to 0.5 μm, 0.04 μm to 0.1 μm, or 0.05 μm to 0.07 μm (50 μm to 70 nm).

In the nickel-based active material according to an embodiment, the large crystal particles may be one-body particles, or secondary particles as aggregates of primary particles. According to an embodiment, the secondary particles may have a size of 1 μm to 9 μm, for example, 3 μm to 9 μm. According to another embodiment, the secondary particles may have a size of 1 μm to 5 μm.

In the nickel-based active material according to an embodiment, the small secondary particles may have a size of 1 μm to 7 μm, 3 μm to 7 μm, or 3 μm to 6 μm.

A lithium secondary battery having stable electrochemical reactivity, suppressed gas generation at high voltages, improved reliability and/or safety, and/or high output and/or long cycle life characteristics may be manufactured by utilizing a positive electrode including a nickel-based active material containing large crystal particles and small secondary particles having particle sizes within the above ranges.

An amount of the large crystal particles may be 5 wt % to 25 wt %, 5 wt % to 15 wt %, or 5 wt % to 10 wt %, based on a total amount of 100 wt % of the large secondary particles, the large crystal particles, and the small secondary particles, and an amount of the small secondary particles may be 5 wt % to 25 wt %, 5 wt % to 15 wt %, or 10 wt % to 15 wt %, based on a total amount of 100 wt % of the large secondary particles, the large crystal particles, and the small secondary particles. When the amounts of the large crystal particles and the small secondary particles are within the above ranges, a positive electrode having improved lifetime characteristics while having excellent capacity characteristics per volume without (e.g., with reduced) deterioration of a swelling characteristic (e.g., due to gas generation at high voltages and/or high temperatures) may be manufactured.

The nickel-based active material according to an embodiment may have an average particle diameter of 10 μm to 20 μm. In some embodiments, the nickel-based active material may have a basic plate form or structure, and may have a variety of suitable shapes including, for example, polygonal nanoplates (such as a hexagonal shape), a spherical shape, an oval shape, a nano-disk shape, or a rectangular parallelepiped shape. When the nickel-based active material does not have a spherical shape, the particle size thereof may refer to a long-axis length.

A mixture density of the positive electrode including the nickel-based active material according to an embodiment may be, for example, 4.0 g/cm$^3$ or greater, 4.1 g/cm$^3$ or greater, 4.15 g/cm$^3$ or greater, or 4.15 g/cm$^3$ to 4.20 g/cm$^3$.

The mixture density of the positive electrode is obtained by rolling the positive active material layer, cutting it into 30 mm×30 mm sample, and measuring the thickness and weight to obtain the mixture density.

A porosity of the positive electrode according to an embodiment may be 15% or less.

The porosity of a solid-state ion conductor (or e.g., positive electrode) may be determined e.g., by scanning electron microscopy, the details of which can be determined by one of skill in the art without undue experimentation. In some embodiments, porosity may be determined using nitrogen isotherms as disclosed in E. P. Barrett, L. G. Joyner, P. P. Halenda, "The determination of pore volume and area distributions in porous substances. I. Computations from nitrogen isotherms," J. Am. Chem. Soc. (1951), 73, 373-380, the details of which can be determined by one of skill in the art without undue experimentation.

The porosity may be measured by, in addition to the above-described method, analysis techniques such as mercury intrusion method, transmission electron microscopy (TEM), or cross-sectional analysis of particles using a focused ion beam (FIB). According to one embodiment, it can be confirmed through a SEM and/or a TEM analysis. The porosity can be expressed by examining the total volume of each pore in the volume occupied by each layer.

The nickel-based active material may be, for example, a compound represented by Formula 1, a compound represented by Formula 2, or a combination thereof:

$$Li_xNi_{1-y}Co_yO_{2-z}X_z, \quad \text{Formula 1}$$

wherein, in Formula 1, $0.9 \le x \le 1.2$, $0 \le y \le 0.2$, $0 \le z \le 0.5$, and $0.8 \le 1-y < 1$ are satisfied, and X is fluorine (F), sulfur (S), phosphorus (P), or a combination thereof, $$Li_xNi_{1-y-z}Co_yM_zO_{2-a}X_a, \quad \text{Formula 2}$$

wherein, in Formula 2, $0.9 \le x \le 1.2$, $0 < y < 0.5$ (for example, $0 < y < 0.2$), $0.8 \le 1-y-z < 1$, $0 \le z \le 0.5$ (for example, $0 \le z \le 0.2$), $0 < y+z \le 0.2$, and $0 \le a < 2$ are satisfied, M is nickel (Ni), cobalt (Co), manganese (Mn), magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), silicon (Si), chromium (Cr), iron (Fe), vanadium (V), a rare earth element, or a combination thereof, and X is F, S, P, or a combination thereof.

In Formulae 1 and 2, the amount of nickel may be 80 mol % or greater, for example, 80 mol % to 95 mol % or 85 mol % to 92 mol %; x may be 1 to 1.05; and y may be 0.01 to 0.19. In some embodiments, in Formula 2, M may be Al, and z may be, for example, 0.01 to 0.05.

The nickel-based active material may be a compound represented by Formula 3, a compound represented by Formula 4, or a combination thereof:

$$Li_xCO_aNi_bMn_cO_2, \quad \text{Formula 3}$$

wherein, in Formula 3, $0.9 < x < 1.2$, $0 < a < 0.5$ (e.g., $0 < a < 0.2$), $0.8 \le b < 1$, $0 < c < 0.5$, and $a+b+c=1$ are satisfied, and $$Li_xCO_aNi_bAl_cO_2, \quad \text{Formula 4}$$

wherein, in Formula 4, $0.9 < x < 1.2$, $0 < a < 0.5$ (e.g., $0 < a < 0.2$), $0.8 \le b < 1$, $0 < c < 0.5$, and $a+b+c=1$ are satisfied.

In Formulae 3 and 4, x may be in a range of 1.0 to 1.1, or 1.0 to 1.05; a may be in a range of, for example, 0.001 to 0.19, 0.01 to 0.1, 0.02 to 0.09, or 0.04 to 0.08; b may be in a range of, for example, 0.8 to 0.99, 0.8 to 0.98, or 0.85 to 0.95; and c may be in a range of, for example, 0.001 to 0.19, 0.001 to 0.1, 0.005 to 0.02, or 0.005 to 0.01.

Non-limiting examples of the nickel-based active material may include $LiNi_{0.9}Co_{0.09}Al_{0.01}O_2$, $LiNi_{0.9}Co_{0.09}Mn_{0.01}O_2$, $Li_{1.05}Ni_{0.9}Co_{0.09}Al_{0.01}O_2$, $Li_{1.05}Ni_{0.9}Co_{0.09}Mn_{0.1}O_2$, $LiNi_{0.9}Co_{0.09}Al_{0.005}Mn_{0.005}O$, $LiNi_{0.94}Co_{0.04}Al_{0.02}O_2$, $LiNi_{0.95}CO_{0.04}Al_{0.01}O_2$, $LiNi_{0.85}Co_{0.14}Al_{0.01}O_2$, $LiNi_{0.8}Co_{0.19}Al_{0.01}O_2$, and $LiNi_{0.94}Co_{0.04}Al_{0.01}Mn_{0.01}O_2$.

According to an embodiment, when a lithium secondary battery is implemented by utilizing a nickel-based active material having a controlled particle size, the high temperature characteristic and rate performance of the lithium secondary battery may be improved, the amount of gas generated at high voltage may be reduced, and/or reliability and/or safety may be secured.

The nickel-based active material according to an embodiment may have a reduced specific surface area by adjusting sizes of primary and secondary particles contained therein, for example by controlling conditions of heat treatment (i.e., a heat treatment temperature, atmosphere, and/or time) during the positive electrode active material manufacturing process. As a result, the nickel-based active material may suppress surface side reactions between residual lithium and an electrolytic solution by reducing the residual lithium as much as possible. In some embodiments, by controlling the manufacturing process in such a manner as described above, the positive electrode active material having secured stability at high voltages while having improved crystallinity may be obtained.

According to an embodiment, in an X-ray diffraction spectrum (XRD) analysis of the nickel-based active material, a full width at half maximum (FWHM) for a (003) plane peak may be 0.120 degrees (°) to 0.270°, for example, 0.120° to 0.150°. In some embodiments, a full width at half maximum for a (104) plane peak may be 0.120° to 0.270°, for example, 0.13° to 0.23°, and an interval between a (108) plane peak and a (110) plane peak may be 0.1° to 0.5°. The full-width-at-half-maximum values and peak interval values indicate crystallinity of the nickel-based active material. From these results, it can be confirmed that the nickel-based active material has a layered crystal structure.

In the X-ray diffraction spectrum analysis for a general nickel-based active material, a lower full-width-at-half-maximum value of the (003) plane peak signifies increased crystallinity of the nickel-based active material. Therefore, the crystallinity of the nickel-based active material according to an embodiment may be higher than that of a general nickel-based active material. When the nickel-based active material having increased crystallinity is utilized, a lithium secondary battery having good safety at high voltages may be manufactured.

Through the X-ray diffraction (XRD) spectrum analysis, it is confirmed that the nickel-based active material may have a hexagonal crystal structure. Here, a length of the a-axis may be in a range of 2.8 Å to 2.9 Å, a length of the c-axis may be in a range of 13.8 Å to 14.3 Å, and a unit cell volume thereof may be in a range of 93.7 Å$^3$ to 104.2 Å$^3$. In the XRD spectrum analysis, a CuK-alpha characteristic X-ray having a wavelength of about 1.541 Å may be utilized as a radiation source.

In the nickel-based active material according to an embodiment, the amount of residual lithium may be 3,000 ppm or less, for example, 2,000 ppm to 3,000 ppm. The amount of the residual lithium may be measured by a titration method. When the amount of the residual lithium is within the above ranges, side reactions of the residual lithium and the electrolytic solution may be inhibited to suppress gas generation at high voltages and at high temperatures, and thus the positive electrode active material may have increased stability. In some embodiments, when the amount of the residual lithium is within the above range, a pH value of a positive electrode slurry may be decreased in a positive electrode slurry preparation process, making the positive electrode slurry stable, and a substantially uniform plate coating process may be possible.

The nickel-based active material according to an embodiment may be prepared utilizing a general nickel-based active material precursor.

A method of preparing the nickel-based active material according to an embodiment will now be described in more detail.

The nickel-based active material may be prepared by, for example, mixing a lithium precursor and a nickel-based active material precursor in a set or predetermined mole ratio, followed by performing a first heat treatment.

The lithium precursor may be or include, for example, lithium hydroxide, lithium fluoride, lithium carbonate, or a mixture thereof. A mixing ratio of the lithium precursor and the nickel-based active material precursor may be stoichiometrically controlled or selected to obtain a nickel-based active material of Formula 2, 3, or 4.

The mixing of the lithium precursor and the nickel-based active material precursor may be a dry mixing process and may be performed utilizing a mixer, etc. The dry mixing process may be performed by milling. The milling is not particularly limited in terms of conditions, and may be performed in any condition so long as deformation of precursor(s) utilized as a starting material (such as being pulverized into fine powders) is minimized or reduced. A size of the lithium precursor mixed with the nickel-based active material precursor may be controlled in advance. The size (average particle diameter) of the lithium precursor may be in a range of 5 μm to 15 μm, for example, about 10 μm. By milling the lithium precursor to have a size in the above range with the nickel-based active material precursor at 300 to 3,000 rpm, a desired or suitable mixture may be obtained. When an internal temperature of the mixer rises to 30° C. or higher during the milling, a cooling process may be performed to maintain the internal temperature of the mixer to be around room temperature (25° C.).

The first heat treatment may be performed in an air or oxygen atmosphere. The first heat treatment may be performed at a temperature, for example, in a range of 600° C. to 800° C., for example, 650° C. to 800° C.

The method of preparing the nickel-based active material may further include performing a second heat treatment performed in an air or oxygen atmosphere after performing the first heat treatment. The second heat treatment may be performed at a temperature, for example, in a range of 700° C. to 900° C.

The nickel-based active material precursor may be prepared by co-precipitation of a nickel precursor and other transition metal precursors. For example, the nickel-based active material precursor may be a hydroxide or an oxide including nickel, cobalt, and other metals.

The nickel-based active material precursor may be prepared by mixing a nickel precursor, a cobalt precursor, and a manganese precursor together with a first solvent. The nickel precursor, the cobalt precursor and the manganese precursor may include any materials that are available in the art, and the amounts of the nickel precursor, the cobalt precursor, and the manganese precursor may be stoichiometrically controlled or selected to obtain a compound of Formula 3.

The first solvent may be water, ethanol, propanol, or butanol. In some embodiments, the amount of the first solvent may be in a range of 100 parts by weight to 2,000 parts by weight, based on a total weight of 100 parts by weight of the nickel precursor, the cobalt precursor, and the manganese precursor.

When the nickel-based active material precursor is mixed with the lithium precursor, a second solvent may be utilized. Like the first solvent, the second solvent may be water, ethanol, propanol, or butanol, and an amount of the second solvent utilized may be 100 parts by weight to 2,000 parts by weight, based on 100 parts by weight of the lithium precursor.

A complexing agent and a pH adjuster may be added and mixed with the mixture of the nickel-based active material precursor and the lithium precursor.

The nickel-based active material precursor may be, for example, a compound represented by Formula 3-1:

$$Ni_{1-y-z}Co_yM_z(OH)_2, \quad \text{Formula 3-1}$$

wherein in Formula 3-1, $0<y<0.5$ (e.g., $0<y<0.2$), $0.8\leq 1-y-z<1$, and $0\leq z\leq 0.5$, and M is Ni, Co, Mn, Mg, Ca, Sr, Ba, Ti, Zr, Nb, Mo, W, Zn, Al, Si, Cr, Fe, V, a rare earth element, or a combination thereof.

The lithium precursor may include one or more selected from lithium hydroxide, lithium carbonate, lithium sulfate, and lithium nitrate. A non-limiting example of the complexing agent may be an ammonia solution as an ammonium ion supplier, and a non-limiting example of the pH adjuster may be a sodium hydroxide aqueous solution.

The pH of the resulting product may be controlled to be in a range from about 11 to about 13 by adjusting an amount of the pH adjuster. In some embodiments, a precipitate may be obtained from the result product, and may be washed utilizing pure water, followed by performing a second thermal treatment, thereby obtaining the nickel-based active material.

According to another aspect, a positive electrode includes the nickel-based active material as an active material. The positive electrode includes: a current collector; and the nickel-based positive electrode active material layer according to an embodiment disposed on the current collector.

The positive electrode may be prepared by, for example, molding a positive electrode active material composition in a set or predetermined shape, the positive electrode active material composition including the positive electrode active material and a binder, or coating the positive electrode active material composition on a current collector made of, for example, an aluminum foil.

For example, in some embodiments, the positive electrode active material composition may be prepared by mixing the positive electrode active material, a conducting agent, a binder, and a solvent. The positive electrode active material composition may be directly coated on a metal current collector, thereby manufacturing a positive electrode plate. In some embodiments, the positive electrode plate may be manufactured by casting the positive electrode active material composition on a separate support, laminating a film separated from the support on a metal current collector. Types (e.g., formats) of the positive electrode are not limited to those listed above, and the positive electrode may be formed to have any suitable type (format).

The positive electrode may further include any suitable positive electrode active material suitable in the art (e.g., mixed or in combination with the nickel-based active material according to embodiments of the present disclosure).

Non-limiting examples of the general positive electrode active material may include, but are not limited to, one or more selected from the group consisting of a lithium cobalt oxide, a lithium nickel cobalt manganese oxide, a lithium nickel cobalt aluminum oxide, a lithium iron phosphorus oxide, and a lithium manganese oxide, and any positive electrode active material that is available in the art may also be utilized.

Non-limiting examples of the positive electrode active material may include compounds represented by one or more of the following formulae: $Li_aA_{1-b}B'_bD_2$ (where $0.90 \leq a \leq 1.8$ and $0 \leq b \leq 0.5$); $Li_aE_{1-b}B'_bO_{2-c}D_c$ (where $0.90 \leq a \leq 1.8$, $0 \leq b \leq 0.5$, and $0 \leq c \leq 0.05$); $LiE_{2-b}B'bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (where $0.90 \leq a \leq 1.8$, $\leq b \leq 0.5$, $0 \leq 5c \leq 0.05$, and $0 < \alpha < 2$); $Li_aNi_{1-b-c}Co_bB'_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_bE_cG'_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG'_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG'_bO_2$ (where $0.90 \leq a \leq 1.8$ and $0.001 \leq b \leq 0.1$); $Li_aCoG'_bO_2$ (where $0.90 \leq a \leq 1.8$ and $0.001 \leq b \leq 0.1$); $Li_aMnG'_bO_2$ (where $0.90 \leq a \leq 1.8$ and $0.001 \leq b \leq 0.1$); $Li_aMn_2G'_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ (where $0 \leq f \leq 2$); and/or $LiFePO_4$.

In the above formulae: A is Ni, Co, Mn, or a combination thereof; B' is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G' is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

In some embodiments, a compound above, the compound including a coating layer on a surface thereof, or a mixture of the compound and the compound including a coating layer may be utilized. The coating layer may include a coating element compound in the form of an oxide of a coating element, a hydroxide of a coating element, an oxyhydroxide of a coating element, an oxycarbonate of a coating element, or a hydroxycarbonate of a coating element. The compounds that form these coating layers may be amorphous or crystalloid. The coating element included in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. Any suitable method (e.g., spray coating, dip coating, etc.) may be utilized as the coating layer forming method as long as it does not adversely affect the physical properties of the positive electrode active material when these coating elements are utilized for the compound. Any suitable coating layer forming method, may be used, and further descriptions thereof will not be provided.

For example, $LiNiO_2$, $LiCoO_2$, $LiMn_xO_{2x}$ (x=1 or 2), $LiNi_{1-x}Mn_xO_2$ ($0 < x < 1$), $LiNi_{1-x-y}Co_xMn_yO_2$ ($0 \leq x \leq 0.5$ and $0 \leq y \leq 0.5$), $LiFeO_2$, $V_2O_5$, TiS, and/or MoS may be utilized as the positive electrode active material.

The conducting agent may be or include carbon black and/or graphite particulates, but embodiments are not limited thereto. Any suitable material available as a conducting agent in the art may be utilized. Non-limiting examples of the conducting agent may include: graphite (such as natural graphite and/or artificial graphite); a carbonaceous material (such as carbon black, acetylene black, Ketjen black, channel black, furnace black, lamp black, and/or thermal black); a conductive fiber (such as carbon fiber and/or metal fiber); a metal powder (such as fluorocarbon, aluminum, and/or nickel powder); a conductive whisker (such as zinc oxide and/or potassium titanate); a conductive metal oxide (such as titanium oxide); and/or a conductive material (such as a polyphenylene derivative).

Non-limiting examples of the binder include a vinylidene fluoride/hexafluoropropylene copolymer, polyvinylidene fluoride (PVDF), polyacrylonitrile, polymethylmethacrylate, polytetrafluoroethylene, mixtures thereof, and/or a styrene butadiene rubber polymer, but embodiments are not limited thereto.

Any suitable material available as a binding agent in the art may be utilized.

Non-limiting examples of the solvent include N-methylpyrrolidone, acetone, and/or water, but are not limited thereto. Any material that is available in the art as a solvent may be utilized.

The amounts of the positive electrode active material, the conducting agent, the binder, and the solvent may be in the ranges generally utilized in the manufacture of a lithium secondary battery in the related art. In some embodiments, one or more of the conducting agent, the binder, and the solvent may be omitted, according to the intended use and/or structure of the lithium secondary battery.

The term "true density" of the positive electrode according to an embodiment may refer to an intrinsic density of a pore-free positive electrode active material. The true density of the positive electrode may be 4.76 g/cc to 5.10 g/cc.

A lithium secondary battery according to another embodiment may include a positive electrode including the positive electrode active material, a negative electrode, and an electrolyte positioned therebetween. The lithium secondary battery may be manufactured in the following manner.

First, a positive electrode may be prepared according to the above-described positive electrode preparing method.

Next, a negative electrode active material, a conducting agent, a binder, and a solvent may be mixed to prepare a negative electrode active material composition. The negative electrode active material composition may be directly coated on a metal current collector and dried to prepare a negative electrode plate. In another embodiment, the negative electrode active material composition may be cast on a separate support, and a film exfoliated from the support may then be laminated on the metal current collector to prepare a negative electrode plate.

Any suitable negative electrode active material that is generally available in the art may be utilized as the negative electrode active material without particular limitation, and non-limiting examples of the negative electrode active material may include lithium metal, a metal that is alloyable with lithium, a transition metal oxide, a transition metal sulfide, a material that is capable of doping or de-doping lithium, a material that is capable of reversibly intercalating and deintercalating lithium ions, and/or a conductive polymer.

The transition metal oxide may be, for example, a tungsten oxide, a molybdenum oxide, a titanium oxide, a lithium titanium oxide, a vanadium oxide, or a lithium vanadium oxide. Non-limiting examples of the transition metal oxide and transition metal sulfide may include: a Group I metal oxide or sulfide (such as CuO, $Cu_2O$, $Ag_2O$, CuS, and/or $CuSO_4$); a Group IV metal oxide or sulfide (such as $TiS_2$ and/or SnO); a Group V metal oxide or sulfide (such as $V_2O_5$, $V_6O_{12}$, $VO_x$ ($0<x<6$), $Nb_2O_5$, $Bi_2O_3$, or $Sb_2O_3$); a Group VI metal oxide or sulfide (such as $CrO_3$, $Cr_2O_3$, $MoO_3$, $MoS_2$, $WO_3$, or $SeO_2$); a Group VII metal oxide or sulfide (such as $MnO_2$ or $Mn_2O_3$); a Group VIII metal oxide or sulfide (such as $Fe_2O_3$, FeO, $Fe_3O_4$, $Ni_2O_3$, NiO, $CoO_3$, or CoO); and/or a metal oxide or sulfide represented by the general formula $Li_xMN_yX_2$ (where M and N are each a Group I to VIII metal, X is oxygen or sulfur, $0.1\leq x\leq 2$, and $0\leq y\leq 1$), for example, lithium titanium oxide as represented by $Li_yTiO_2$ ($0\leq y\leq 1$), $Li_{4+y}Ti_5O_{12}$ ($0\leq y\leq 1$), or $Li_{4+y}Ti_{11}O_{20}$ ($0\leq y\leq 1$).

Non-limiting examples of the material that is capable of doping or de-doping lithium may include Si, SiOx ($0<x\leq 2$), a Si—Y' alloy (where Y' may be an alkali metal, an alkali earth metal, an element of Group 13, an element of Group 14 excluding Si, a transition metal, a rare earth element, or a combination thereof), Sn, $SnO_2$, a Sn—Y' alloy (where Y' may be an alkali metal, an alkali earth metal, an element of Group 13, an element of Group 14 excluding Sn, a transition metal, a rare earth element, or a combination thereof), and/or a mixture of at least one thereof with $SiO_2$. The element Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

The material that is capable of reversibly intercalating and deintercalating lithium ions may be a carbonaceous material, and any carbonaceous negative electrode active material that is generally utilized in the manufacture of a lithium secondary battery may be utilized. The carbonaceous material may be, for example, crystalline carbon, amorphous carbon, and mixtures thereof. Non-limiting examples of the crystalline carbon may include natural graphite that is in shapeless, plate, flake, spherical, and/or fibrous form, and/or artificial graphite, and non-limiting examples of the amorphous carbon may include soft carbons (carbons calcined at low temperatures), hard carbons, meso-phase pitch carbides, and/or calcined cokes.

Non-limiting examples of the conductive polymer may include a disulfide material, polypyrrole, polyaniline, polyparaphenylene, polyacetylene, and/or a polyacene material.

The same conducting agent, binder, and solvent as those in the above-described positive electrode active material composition may be utilized in a negative electrode active material composition.

The amounts of the negative electrode active material, the conducting agent, the binder, and the solvent may be in the ranges generally utilized in the manufacture of lithium secondary batteries in the related art. In some embodiments, one or more of the conducting agent, the binder, and the solvent maybe omitted (e.g., not included), according to the intended use and/or structure of the lithium secondary battery.

The negative electrode active material may further include a thickener. The thickener may include one or more of carboxymethyl cellulose (CMC), carboxyethyl cellulose, starch, regenerated cellulose, ethyl cellulose, hydroxymethyl cellulose, hydroxyethyl cellulose, hydroxypropyl cellulose, styrene butadiene rubber (SBR), and/or polyvinyl alcohol. For example, CMC may be utilized as the thickener.

The negative electrode active material may further include a conducting agent, as necessary. The conducting agent is not particularly limited, and may be any material available in the art as having suitable conductivity without causing a chemical change, and non-limiting examples thereof may include: a carbonaceous material (such as carbon black, acetylene black, Ketjen black, channel black, furnace black, lamp black, graphite such as natural graphite and/or artificial graphite, and/or thermal black); conductive fibers (such as carbon fiber and/or metal fiber); a metal powder (such as carbon fluoride powder, aluminum powder, and/or nickel powder); conductive whiskers (such as zinc oxide and/or potassium titanate); a conductive metal oxide (such as titanium oxide); and/or any other conducting material (such as a polyphenylene derivative). The conducting agent may be carbon black, for example, carbon black having an average particle diameter of several tens of nanometers.

Next, a separator to be inserted between the positive electrode and the negative electrode is prepared. The separator may be any suitable separator that is generally utilized in a lithium secondary battery. A separator having low resistance to migration of ions (e.g., lithium ion diffusion) in an electrolyte and/or having excellent electrolyte-retaining ability may be utilized. Non-limiting examples of the separator include glass fiber, polyester, Teflon, polyethylene, polypropylene, polytetrafluoroethylene (PTFE), and/or combinations thereof, each of which may be in the form of a non-woven or woven fabric. For example, a rollable separator including polyethylene and/or polypropylene may be utilized for a lithium ion battery, and a separator with a good organic electrolytic solution-retaining ability may be utilized for a lithium ion polymer battery. For example, the separator may be manufactured in the following manner:

A polymer resin, a filler, and a solvent may be mixed together to prepare a separator composition. The separator composition may be directly coated on an electrode, and then dried to form the separator. In some embodiments, the separator composition may be cast on a support and then dried to form a separator film, which may then be separated from the support and laminated on an electrode to form the separator.

The polymer resin utilized in preparation of the separator is not particularly limited, and any suitable material utilized as a binding agent of an electrode plate may be utilized. Non-limiting examples of the polymer resin utilized in preparation of the separator may include a vinylidene fluoride/hexafluoropropylene copolymer, polyvinylidene fluoride (PVDF), polyacrylonitrile, polymethylmethacrylate, and/or one or more mixtures thereof, and/or a styrene butadiene rubber polymer, but embodiments are not limited thereto.

Next, an electrolyte is prepared.

For example, the electrolyte may be an organic electrolyte. The organic electrolyte solution may be prepared by dissolving a lithium salt in an organic solvent.

As the organic solvent, any suitable material available as an organic solvent in the art may be utilized. Non-limiting examples of the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, and/or a mixture thereof.

The lithium salt may also be any suitable material available as a lithium salt in the art. Non-limiting examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, and/or a mixture thereof.

In some embodiments, the electrolyte may be a solid electrolyte, (such as an organic solid electrolyte and/or an inorganic solid electrolyte). When a solid electrolyte is utilized, the solid electrolyte may also function as a separator.

Non-limiting examples of the organic solid electrolyte may include polyethylene derivatives, polyethylene oxide derivatives, polypropylene oxide derivatives, phosphoric acid ester polymers, poly alginate lysine, polyester sulfide, polyvinyl alcohols, polyvinylidene fluoride, and/or polymers containing ionic dissociation groups.

Non-limiting examples of the inorganic solid electrolyte may include boron oxides and/or lithium oxynitrides, and may be any inorganic solid electrolyte that can be suitably utilized as a solid electrolyte. The solid electrolyte may be formed on the negative electrode by, for example, sputtering. Non-limiting examples of the lithium salt may include $Li_3N$, LiI, $Li_5NI_2$, $Li_3N$—LiI—LiOH, $LiSiO_4$, $Li_2SiS_3$, $Li_4SiO_4$, $Li_4SiO_4$—LiI—LiOH, and/or $Li_3PO_4$—$Li_2S$—$SiS_2$.

Figure 9:
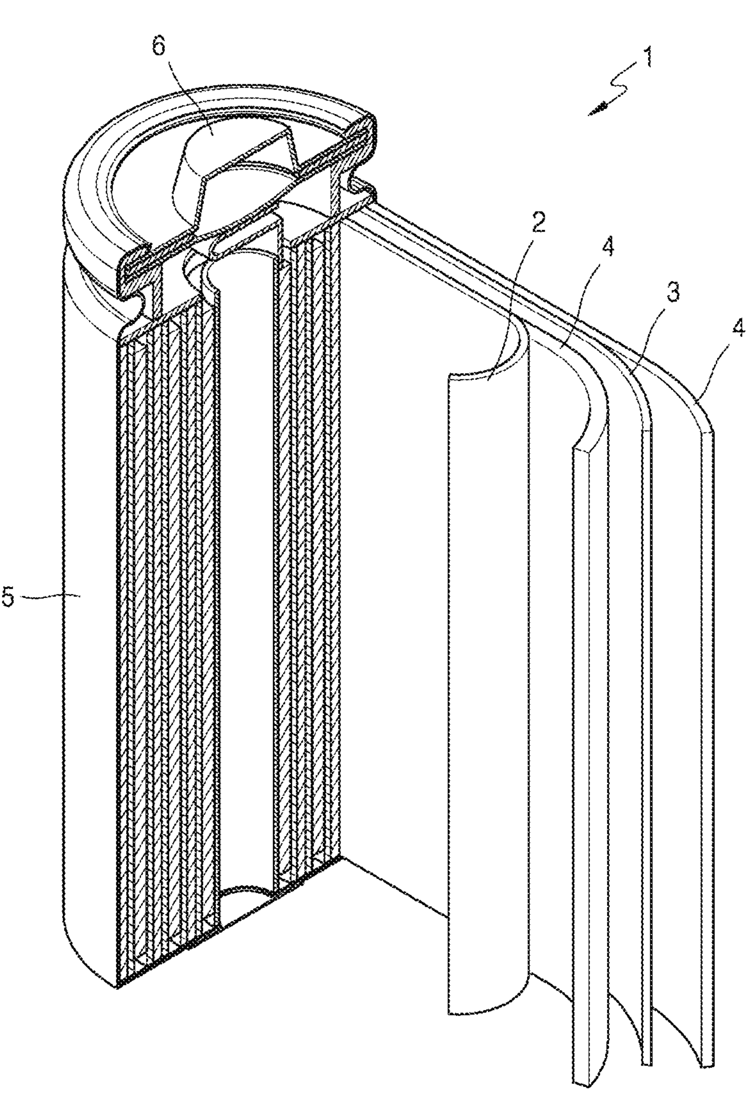
FIG. 9 is a schematic view of a lithium secondary battery according to an embodiment.

As shown in FIG. 9, an example lithium secondary battery 1 includes a positive electrode 3, a negative electrode 2, and a separator 4. The positive electrode 3, the negative electrode 2, and the separator 4 may be wound or folded and then placed in a battery case 5. Next, an organic electrolytic solution are injected into the battery case 5 and a cap assembly 6 may seal the battery case 5, thereby completing the lithium secondary battery 1. The battery case may be a cylindrical type or format, a rectangular type or format, or a thin-film type or format. For example, the lithium secondary battery may be a thin-film type or format battery. The lithium secondary battery may be a lithium ion secondary battery.

The separator may be placed between the positive electrode and the negative electrode to form a battery structure. In some embodiments, the battery structure may be stacked in a bi-cell structure and impregnated in the organic electrolyte solution, and the resultant product may be put into a pouch and hermetically sealed, thereby completing manufacture of a lithium ion polymer battery.

In some embodiments, a plurality of battery structures may be stacked to form a series-connected battery pack, which may be utilized in any device that requires high capacity and high output. For example, the battery pack may be utilized in a laptop computer, a smart phone, and/or an electric vehicle.

The lithium secondary battery may have excellent or suitable high temperature cycle characteristics and/or high-temperature stability, and thus may be suitable for a medium- and large-sized energy storage device. The lithium secondary battery may be utilized as a power source for, for example, an electric vehicle (EV). The lithium secondary battery may be suitably utilized as a power source of, for example, a hybrid electric vehicle (such as a plug-in hybrid electric vehicle (PHEV)).

The present disclosure will now be described in greater detail through the following examples and comparative examples. However, examples are provided merely as examples, and embodiments of the present disclosure are not limited thereto.

Preparation of Large Secondary Particles, Large Crystal Particles, and Small Secondary Particles

Preparation Example 1: Preparation of $LiNi_{0.95}Co_{0.04}Al_{0.01}O_2$(NCA) Large Secondary Particles (Particle A) Having an Average Particle Diameter of 18 μm $Al_2(SO_4)_3(H_2O)_{18}$ as an aluminum precursor was mixed with NaOH, $NH_4OH$ and water in a reactor to prepare an aluminum precursor aqueous solution.

Separately, $NiSO_4(H_2O)_6$ as a nickel precursor and $CoSO_4(H_2O)_7$ as a cobalt precursor were mixed with water to obtain a nickel precursor aqueous solution and a cobalt precursor aqueous solution, respectively.

The aluminum precursor was added to the reactor, and the nickel precursor aqueous solution and the cobalt precursor aqueous solution were added dropwise thereto, yielding a reaction mixture, and the reaction mixture was then stirred for 15 hours. The amounts of the nickel precursor, the cobalt precursor, and the aluminum precursor were stoichiometrically controlled to have a mixing mole ratio of 95:4:1 in the reaction mixture of nickel, cobalt, and aluminum.

A sodium hydroxide aqueous solution was added dropwise to the reaction mixture to adjust a pH to be in a range of 10 to 12. The obtained precipitate was filtered and then washed to obtain a resultant product, followed by drying in vacuum at a temperature of 100° C., thereby preparing a $Ni_{0.95}Co_{0.04}Al_{0.01}(OH)_2$ powder as a nickel cobalt aluminum hydroxide.

The nickel cobalt aluminum hydroxide and the lithium precursor were mixed together in a mortar, and the mixture was put into a furnace, followed by performing a heat treatment at 720° C. for 20 hours with a stream of $O_2$, thereby preparing a nickel-based active material. The amounts of the nickel cobalt aluminum hydroxide and the lithium precursor were controlled to have a mixing ratio of transition metal and lithium being 1:1.02.

The nickel-based active material prepared according to the method was $LiNi_{0.95}Co_{0.04}Al_{0.01}O_2$(NCA) including large secondary particles, and an average particle diameter of the large secondary particles was 18 μm.

Preparation Example 2: Preparation of One-Body $LiNi_{0.85}Co_{0.14}Al_{0.01}O_2$(NCA) Large Crystal Particles (Particle B) Having an Average Particle Diameter of 4 μm One-body $LiNi_{0.85}Co_{0.14}Al_{0.01}O_2$(NCA) large crystal particles were prepared in substantially the same manner as in Preparation Example 1, except that the precursor sizes were controlled by changing a stirring time of a reaction mixture for obtaining a nickel cobalt aluminum hydroxide into 30 hours, a heat treatment was performed at a temperature of 900° C., instead of 720° C., followed by a pulverizing process, and a heat treatment was then performed at 750° C.

In the large crystal particles prepared according to the method, an average particle diameter of one-body-type or kind primary particles was about 4 μm. The average particle diameter of the primary particles was measured utilizing a scanning electron microscope (SEM) [FEI Sirion].

Preparation Example 3: Preparation of $LiNi_{0.8}Co_{0.19}Al_{0.01}O_2$ (NCA) Small Secondary Particles (Particle C) Having an Average Particle Diameter of 4 μm Small secondary $LiNi_{0.8}Co_{0.19}Al_{0.01}O_2$ (NCA) particles (particle C) having an average particle diameter of about 4 μm were prepared in substantially the same manner as in Preparation Example 1, except that the heat treatment temperature was controlled to 800° C.

Preparation Example 4: Preparation of One-Body NCA Large Crystal Particles Having an Average Particle Diameter of 5 μm One-body $LiNi_{0.85}Co_{0.14}Al_{0.01}O_2$(NCA) particles having an average particle diameter ($D_{50}$) of about 5 μm were prepared in substantially the same manner as in Preparation Example 2, except that the stirring time was changed so as to obtain the one-body $LiNi_{0.85}Co_{0.14}Al_{0.01}O_2$(NCA) particles, and an average particle diameters of primary particles in the obtained positive electrode active material was about 5 μm.

Preparation Example 5: Preparation of One-Body NCA Large Crystal Particles Having an Average Particle Diameter of 1 μm One-body $LiNi_{0.85}Co_{0.14}Al_{0.01}O_2$(NCA) particles having an average particle diameter ($D_{50}$) of about 1 μm were prepared in substantially the same manner as in Preparation Example 2, except that the stirring time was changed so as to obtain the one-body $LiNi_{0.85}Co_{0.14}Al_{0.01}O_2$(NCA) particles, and an average particle diameters of primary particles in the obtained positive electrode active material was about 1 μm.

Comparative Preparation Example 1: Preparation of One-Body Large Crystal Particles (Particle B) Having an Average Particle Diameter of 6.4 μm One-body large crystal particles having an average particle diameter of about 6.4 μm were prepared in substantially the same manner as in Preparation Example 4, except that the stirring time was changed so as to obtain the one-body large crystal particles having an average particle diameter of about 6.4 μm.

Comparative Preparation Example 2: Preparation of One-Body Large Crystal Particles (Particle B) Having an Average Particle Diameter of 0.5 μm One-body large crystal particles having an average particle diameter of about 0.5 μm were prepared in substantially the same manner as in Preparation Example 4, except that the stirring time was changed so as to obtain the one-body large crystal particles having an average particle diameter of about 0.5 μm.

Preparation of Nickel-Based Active Material and Lithium Secondary Battery Example 1

A nickel-based active material was obtained by mixing $LiNi_{0.95}Co_{0.04}Al_{0.01}O_2$ (NCA) large secondary particles (particle A) prepared according to Preparation Example 1, having an average particle diameter of about 18 μm, one-body $LiNi_{0.85}Co_{0.14}Al_{0.01}O_2$(NCA) large crystal particles (particle B) prepared according to Preparation Example 2, having an average particle diameter of about 4 μm, and $LiNi_{0.8}Co_{0.19}Al_{0.01}O_2$(NCA) small secondary particles (particle C) prepared according to Preparation Example 3, having an average particle diameter of about 4 μm, and the obtained nickel-based active material was prepared as a positive electrode active material. A mixing weight ratio of particle A, particle B and particle C was 80:10:10.

The positive electrode active material, a carbon conducting agent (Super P) and a polyvinylidene fluoride (PVDF) binder solution were mixed to prepare an active material slurry. In the active material slurry, a mixing weight ratio of the positive active material, the conducting agent and the binder was 98:1:1. The slurry was coated on a 12 μm thick aluminum current collector utilizing a thick-film coating device to have a loading level of 36 mg/cm$^2$, and the resultant product was dried at a temperature of 120° C. for about 1 hour or longer, followed by a press-rolling process to prepare a positive electrode.

A negative electrode active material slurry was prepared by mixing, in a weight ratio of 98:2, graphite powder (Japan carbon) as a negative electrode active material, and a mixture of styrene butadiene rubber (SBR) and carboxymethyl cellulose (CMC) mixed in a weight ratio of 1:1.

The prepared negative electrode active material slurry was coated on a 8 μm thick copper foil current collector to an amount of 19.5 mg/cm$^2$. An electrode plate in which the coating was completed was dried at a temperature of 100° C. for 1 hour or longer, followed by a press-rolling process to manufacture an negative electrode having a mixture density of 1.66 g/cm$^3$.

A lithium secondary battery having 2,000 mAh capacity was manufactured utilizing the positive electrode, the negative electrode, a polyethylene separator (STAR 20, Asahi), and an electrolyte solution in which 1.15 M of $LiPF_6$ is dissolved in a mixed solvent of EC (ethylene carbonate), EMC (methylethyl carbonate), and DMC (dimethyl carbonate) (volume ratio of 3:3:4).

Example 2

A lithium secondary battery was manufactured in substantially the same manner as in Example 1, except that the mixing weight ratio of particle A, particle B and particle C was changed to 80:5:15 in preparing a nickel-based active material.

Examples 3 and 4

Additional lithium secondary batteries were manufactured in substantially the same manner as in Example 1, except that, instead of large secondary particles $LiNi_{0.95}Co_{0.04}Al_{0.01}O_2$(NCA) (particle A) having an average particle diameter of about 18 μm, large secondary particles $LiNi_{0.95}Co_{0.04}Al_{0.01}O_2$(NCA) (particle A) having an average particle diameter of about 10 μm, and large secondary particles $LiNi_{0.95}Co_{0.04}Al_{0.01}O_2$(NCA) (particle A) having an average particle diameter of about 14 μm, were utilized in preparing the nickel-based active materials, respectively.

Examples 5 and 6

Additional lithium secondary batteries were manufactured in substantially the same manner as in Example 1, except that, instead of one-body $LiNi_{0.85}Co_{0.14}Al_{0.01}O_2$ (NCA) large crystal particles (particle B) prepared according to Preparation Example 2 and having an average particle diameter of about 4 μm, one-body particle $LiNi_{0.85}Co_{0.14}Al_{0.01}O_2$(NCA) large crystal particles (particle B) prepared according to Preparation Example 5, having an average particle diameter of about 1 μm and one-body particle $LiNi_{0.85}Co_{0.14}Al_{0.01}O_2$(NCA) large crystal particles (particle B) prepared according to Preparation Example 4, having an average particle diameter of about 5 μm, were utilized in preparing nickel-based active materials, respectively.

Examples 7 and 8

Additional lithium secondary batteries were manufactured in substantially the same manner as in Example 1, except that, instead of $LiNi_{0.8}Co_{0.19}Al_{0.01}O_2$(NCA) small secondary particles (particle C) having an average particle diameter of about 4 μm, $LiNi_{0.8}Co_{0.19}Al_{0.01}O_2$(NCA) small secondary particles (particle C) having an average particle diameter of about 1 μm and $LiNi_{0.8}Co_{0.19}Al_{0.01}O_2$(NCA) small secondary particles (particle C) having an average particle diameter of about 5 μm, were utilized in preparing nickel-based active materials, respectively.

Examples 9 to 11

Additional lithium secondary batteries were manufactured in substantially the same manner as in Example 1, except that mixtures of large secondary particles (particle A), large crystal particles (particle B) and small secondary particles (particle C) having the compositions listed in Table 1 were utilized as positive electrode active materials, respectively.

TABLE 1

| Data | Particle A | Particle B | Particle C |
|---|---|---|---|
| Example 1 | $LiNi_{0.95}Co_{0.04}Al_{0.01}O_2$ | $LiNi_{0.85}Co_{0.14}Al_{0.01}O_2$ | $LiNi_{0.8}Co_{0.19}Al_{0.01}O_2$ |
| Example 9 | $LiNi_{0.95}Co_{0.04}Al_{0.01}O_2$ | $LiNi_{0.9}Co_{0.085}Al_{0.015}O_2$ | $LiNi_{0.8}Co_{0.19}Al_{0.01}O_2$ |
| Example 10 | $LiNi_{0.95}Co_{0.04}Al_{0.01}O_2$ | $LiNi_{0.9}Co_{0.085}Al_{0.015}O_2$ | $LiNi_{0.95}Co_{0.04}Al_{0.01}O_2$ |
| Example 11 | $LiNi_{0.95}Co_{0.04}Al_{0.01}O_2$ | $LiNi_{0.8}Co_{0.15}Al_{0.05}O_2$ | $LiNi_{0.8}Co_{0.15}Al_{0.05}O_2$ |

Comparative Example 1

A lithium secondary battery was manufactured in substantially the same manner as in Example 1, except that large crystal particles (one-body particle) including primary particles prepared according to Comparative Preparation Example 1, having an average particle diameter of about 6.4 μm, were utilized as the particle B in preparing a nickel-based active material.

Comparative Example 2

A lithium secondary battery was manufactured in substantially the same manner as in Example 1, except that small secondary particles $LiNi_{0.8}Co_{0.19}Al_{0.01}O_2$ (NCA) (particle C) having an average particle diameter of about 4 μm were not utilized (included) in preparing a nickel-based active material.

Comparative Example 3

A lithium secondary battery was manufactured in substantially the same manner as in Example 1, except that large crystal particles (one-body particle) including primary particles prepared according to Comparative Preparation Example 2, having an average particle diameter of about 0.5 μm, were utilized as the particle B in preparing a nickel-based active material.

Evaluation Example 1: Size Analysis of Primary Particles and Secondary Particles Utilizing Scanning Electron Microscopy (SEM)

An SEM image of the nickel-based active material prepared according to Example 1 was analyzed. Equipment utilized for SEM analysis was commercially available in the model name of Sirion (FEI, USA).

A result of the SEM analysis of Example 1 is shown in FIG. 1.

Referring to FIG. 1, it was confirmed that the nickel-based active material of Example 1 contained large secondary particles (particle A), large one-body crystal particles (particle B), and small secondary particles (particle C).

Figure 2:
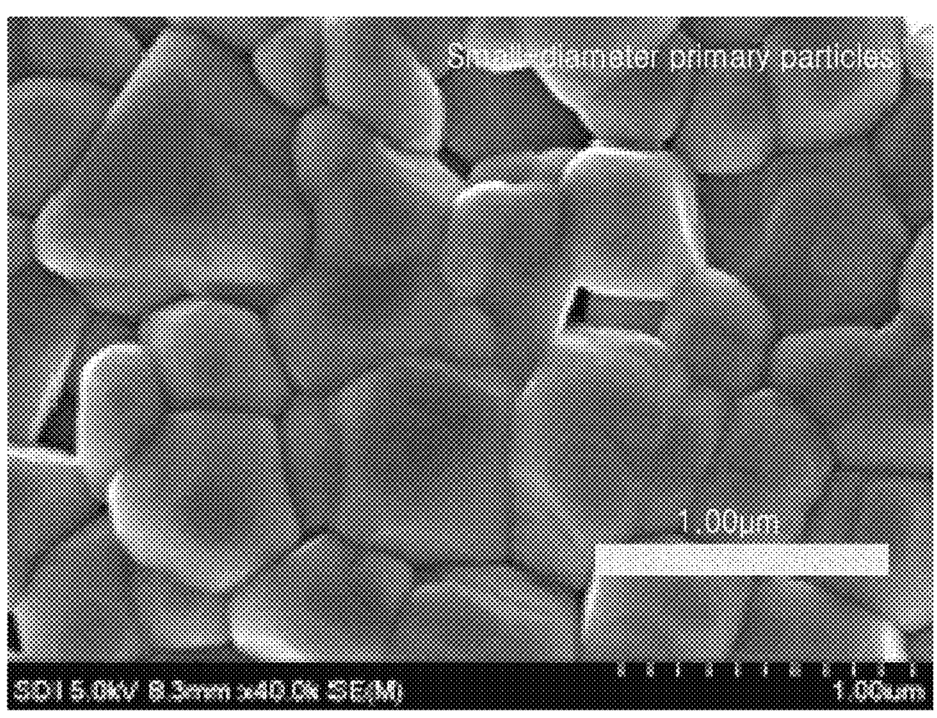
FIGS. 2 and 3 are SEM images of large crystal particles and small secondary particles in the positive electrode active material of FIG. 1, respectively.
Figure 3:
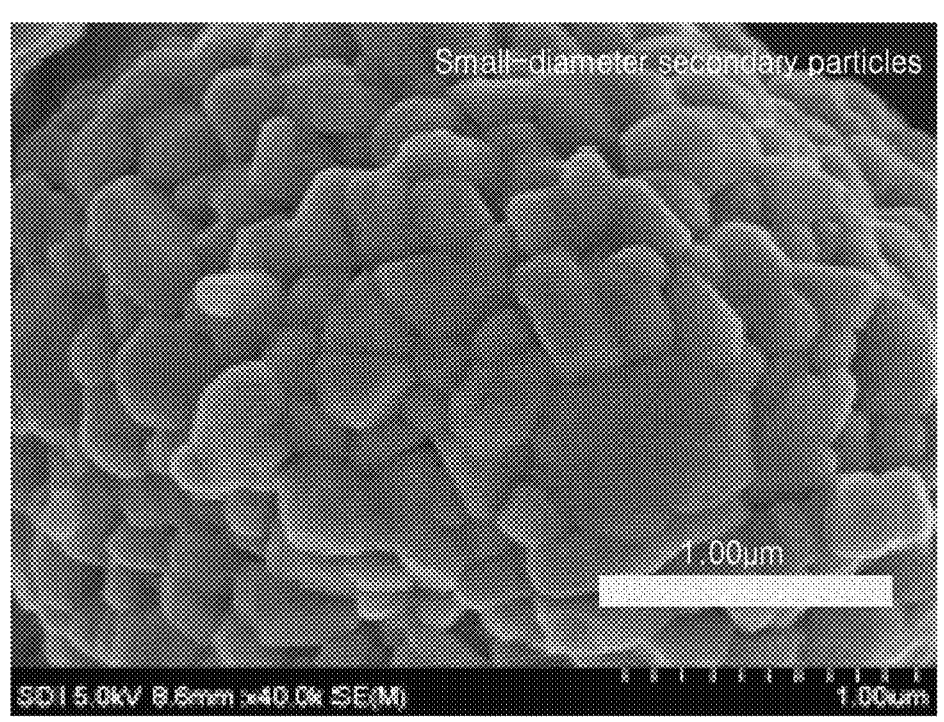

In the nickel-based active material shown in FIG. 1, an SEM image of the large crystal particles (e.g., which have a relatively small diameter) is shown in FIG. 2, and an SEM image of the small secondary particles is shown in FIG. 3.

Figure 4A:
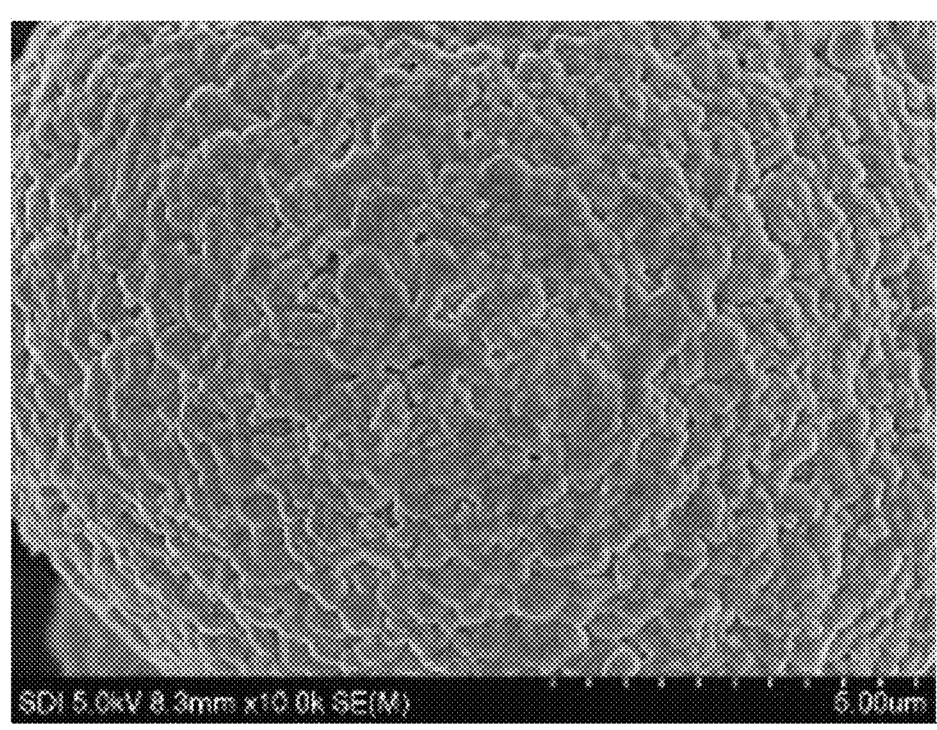
FIGS. 4A-4C are SEM images of large secondary particles prepared in Preparation Example 1.
Figure 4B:
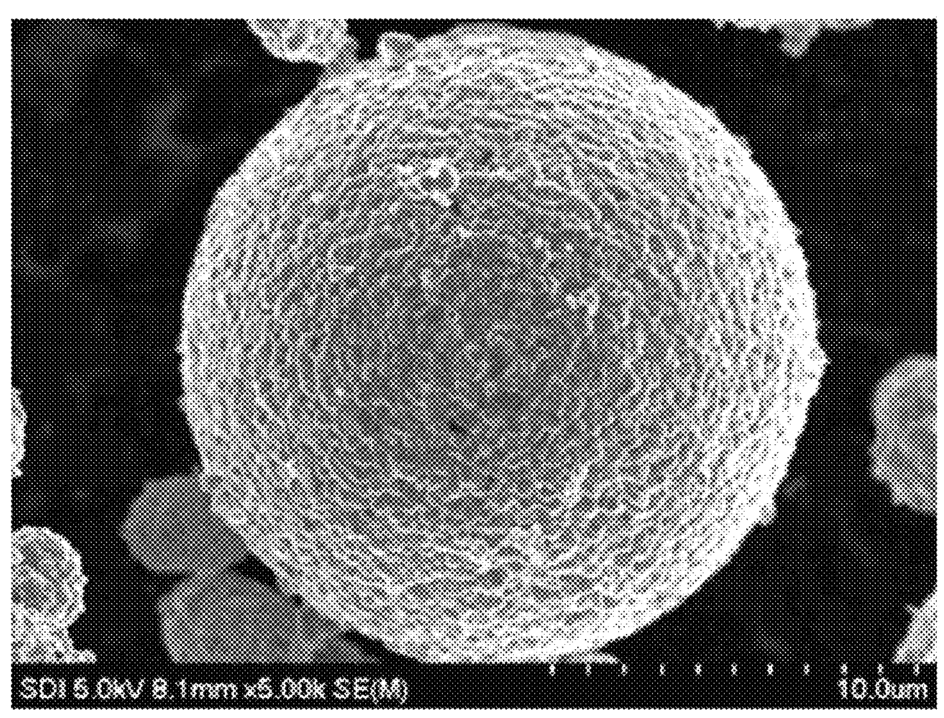
Figure 4C:
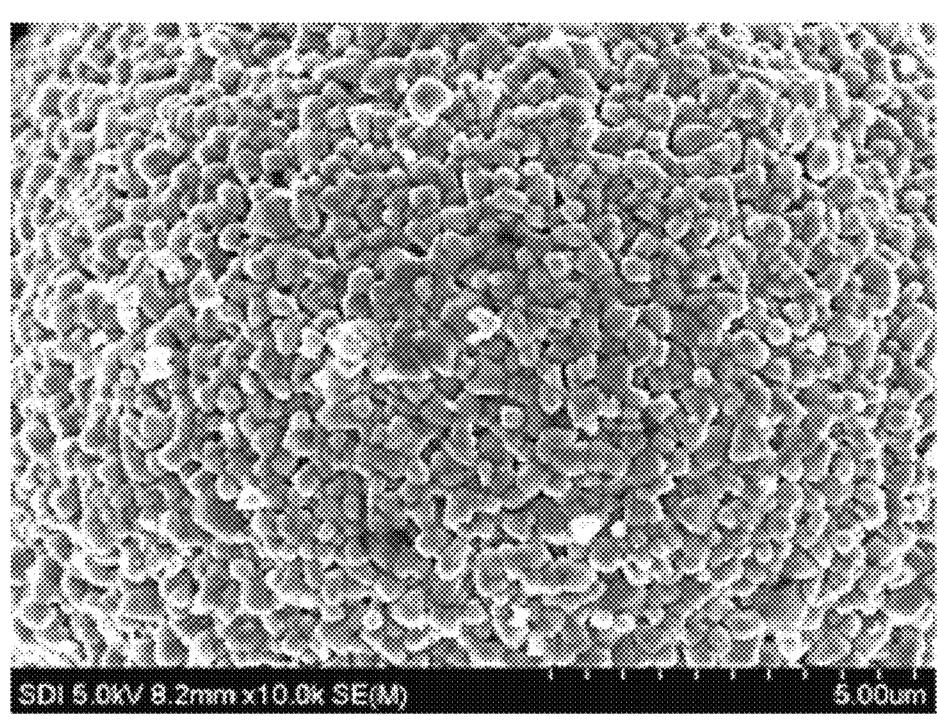
Figure 5A:
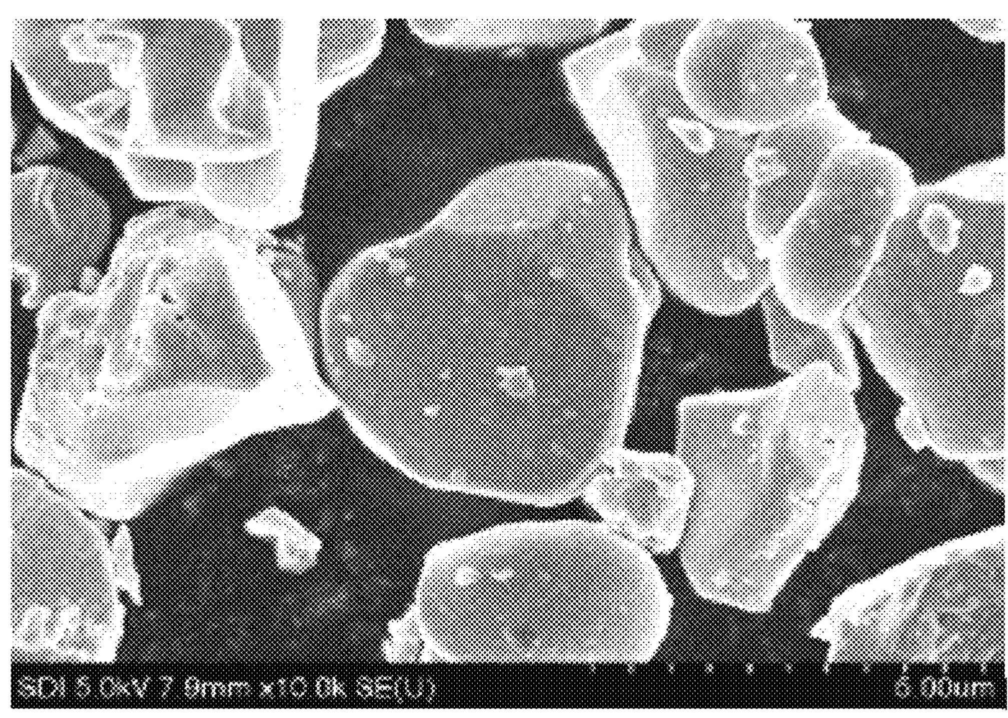
FIGS. 5A and 5B are SEM images of large crystal particles prepared in Preparation Example 2.
Figure 5B:
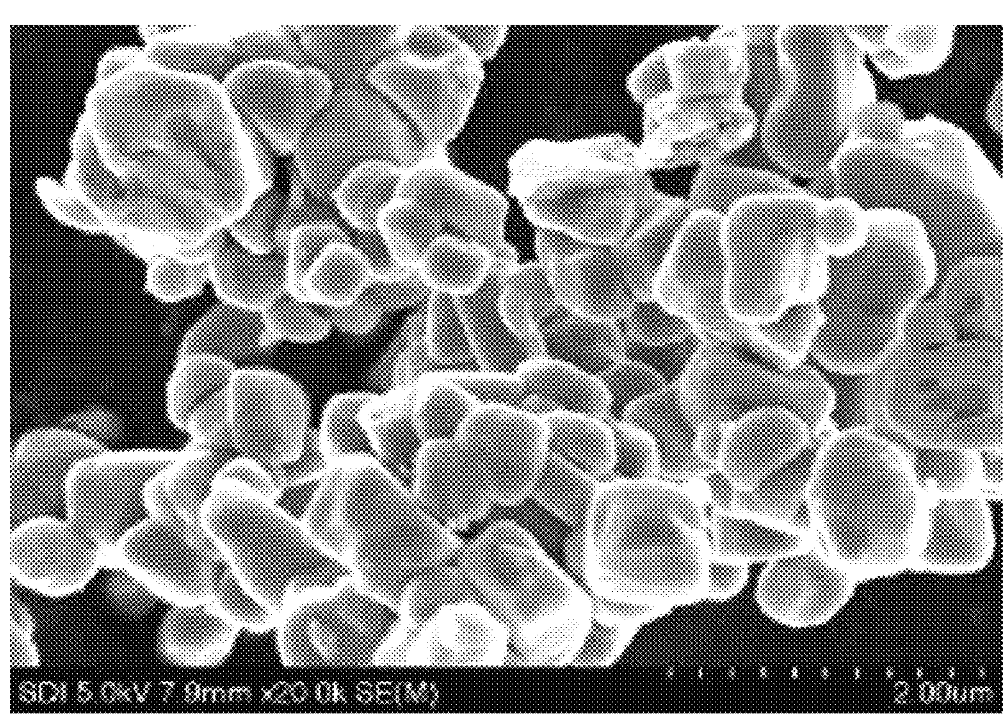
Figure 6A:
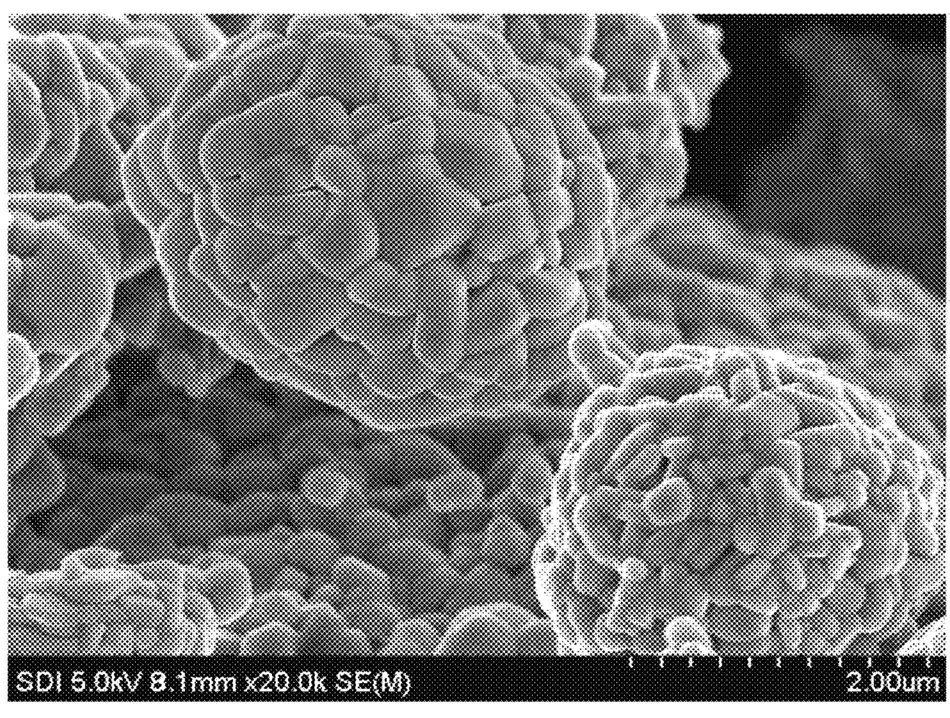
FIGS. 6A and 6B are SEM images of small secondary particles prepared in Preparation Example 3.
Figure 6B:
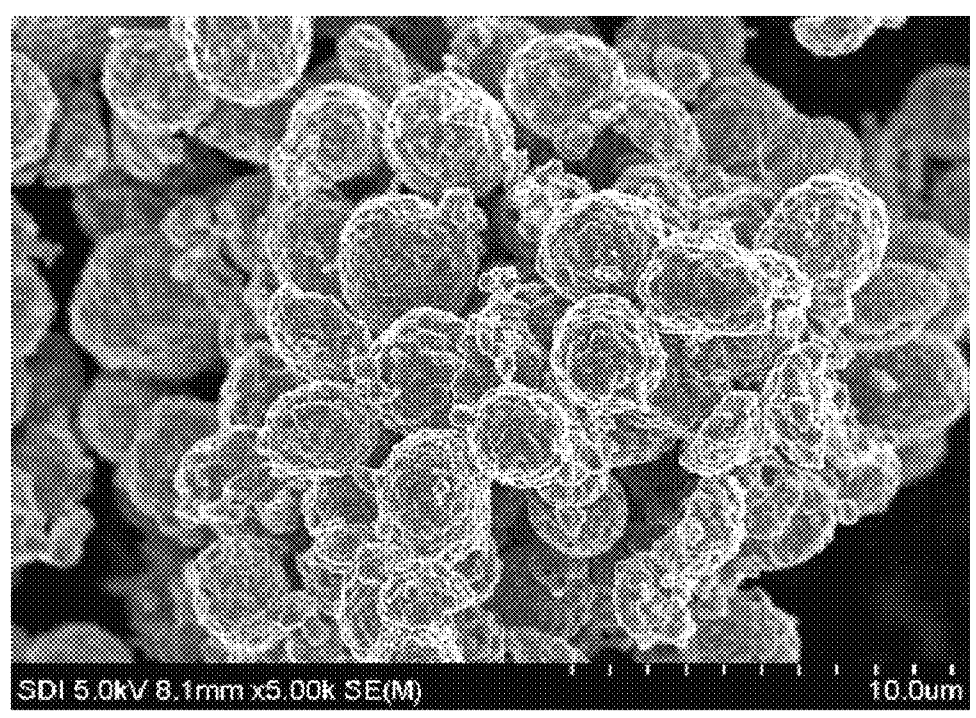

SEM analysis results of the large secondary particles prepared according to Preparation Example 1 are shown in FIGS. 4A-4C; SEM analysis results of the large crystal particles prepared according to Preparation Example 2 are shown in FIGS. 5A and 5B; and SEM analysis results of the small secondary particles prepared according to Preparation Example 3 are shown in FIGS. 6A and 6B.

Evaluation Example 2: X-Ray Diffraction Analysis

XRD analysis was performed on the nickel-based active material prepared according to Example 1. In XRD analysis, an analysis device Xpert PRO (Philips/Power 3 kW) was utilized.

The average particle diameter of the primary particles in the nickel-based active material, obtained from XRD analysis results, may be calculated by the Scherrer equation utilizing the full width at half maximum of a peak associated with the (003) crystal plane. In the nickel-based active material of Example 1, the average particle diameter of the primary particles constituting the large secondary particles, the large crystal particles and the small secondary particles is in a range of 50 nm to 70 nm, as derived from the Scherrer equation.

Evaluation Example 3: Room Temperature Lifetime and Rate Performance

The lithium secondary batteries manufactured in Examples 1 to 4, 7, and 8 and Comparative Example 1 were charged and discharged under the following conditions.

A first cycle of charging and discharging was performed with a current of 0.1 C until the voltage reached 3.0 V to 4.25 V, and then the batteries were discharged at 0.1 C, 0.2 C, 0.5 C, 1.0 C, 2.0 C, or 3.0 C to evaluate the high rate discharge characteristics through discharge capacity ratios. After a total of 50 additional charge and discharge cycles were performed at 1.0 C, lifetime characteristics were evaluated from the capacity retention rates, and the evaluation results are shown in Table 2.

During the first cycle, constant-current charging was performed with a current of 0.1 C until the voltage reached 4.25 V, and then constant-voltage charging was performed until the current reached 0.05 C. The charged cells were rested for about 10 minutes and then subjected to constant-current discharging with a current of 0.1 C until the voltage reached 3.0 V.

During a second cycle, constant-current charging was performed with a current of 0.2 C until the voltage reached 4.25 V, and then constant-voltage charging was performed until the current reached 0.05 C. The charged cells were rested for about 10 minutes and then subjected to constant-current discharging with a current of 0.2 C until the voltage reached 3.0 V.

During a third cycle, constant-current charging was performed with a current of 0.5 C until the voltage reached 4.25 V, and then constant-voltage charging was performed until the current reached 0.05 C. The charged cells were rested for about 10 minutes and then subjected to constant-current discharging with a current of 0.5 C until the voltage reached 3.0 V.

During a fourth cycle, constant-current charging was performed with a current of 0.5 C until the voltage reached 4.25 V, and then constant-voltage charging was performed until the current reached 0.05 C. The charged cells were rested for about 10 minutes and then subjected to constant-current discharging with a current of 1.0 C until the voltage reached 3.0 V.

During a fifth cycle, constant-current charging was performed with a current of 2.0 C until the voltage reached 4.25 V, and then constant-voltage charging was performed until the current reached 0.05 C. The charged cells were rested for about 10 minutes and then subjected to constant-current discharging with a current of 2.0 C until the voltage reached 3.0 V.

During a sixth cycle, constant-current charging was performed with a current of 3.0 C until the voltage reached 4.25 V, and then constant-current charging was performed until the current reached 0.05 C. The charged cells were rested for about 10 minutes and then subjected to constant-current discharging with a current of 3.0 C until the voltage reached 3.0 V.

Figure 7:
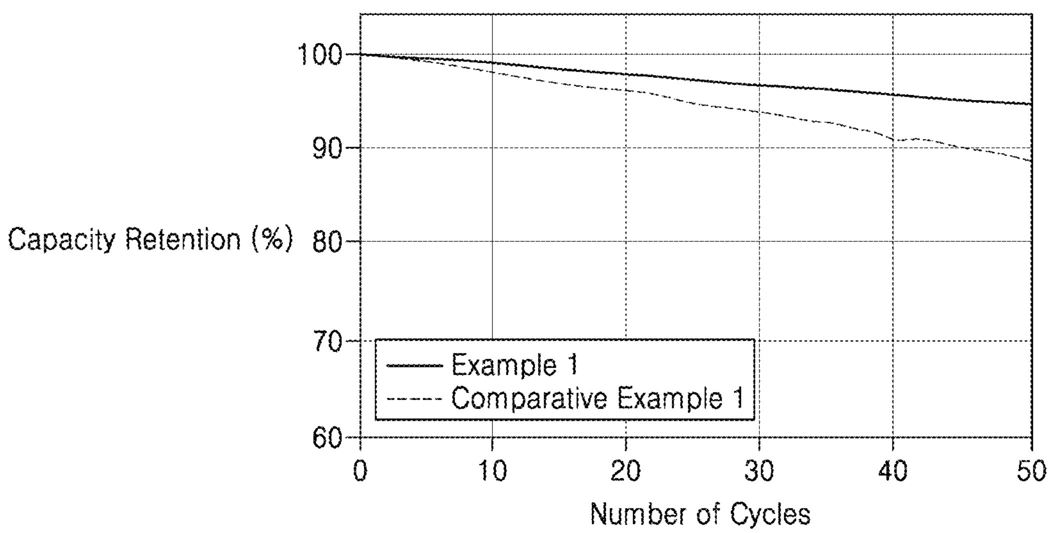
FIG. 7 shows the room-temperature lifetime characteristics of the lithium secondary batteries according to Example 1 and Comparative Example 1.

After the sixth cycle, in order to evaluate the cells under the 0.5 C, 1.0 C, 2.0 C, or 3.0 C conditions, constant-current charging was performed on each sample cell with a current corresponding to the above conditions until the voltage reached 4.25 V, and then constant-voltage charging was performed until the current reached 0.05 C. The charged cells were rested for about 10 minutes and then subjected to constant-current discharging with the corresponding current until the voltage reached 3.0 V, and this procedure was repeatedly performed 50 times to evaluate the cycle characteristics of the cells. The cycle characteristic evaluation results are shown in FIG. 7 and Table 2.

TABLE 2

| | Discharge capacity (mAh/g) | | | | | | Rate performance (@ 50th cycle) | | | |
|---|---|---|---|---|---|---|---|---|---|---|
| Data | 0.1 C | 0.2 C | 0.5 C | 1.0 C | 2.0 C | 3.0 C | 0.5 C | 1.0 C | 2.0 C | 3.0 C |
| Example 1 | 210.0 | 206.5 | 200.2 | 196.5 | 182.2 | 177.9 | 96.4% | 93.5% | 90.3% | 88.2% |
| Example 2 | 208.7 | 205.8 | 199.7 | 196.7 | 183.3 | 179.2 | 95.7% | 92.7% | 88.2% | 86.1% |
| Example 3 | 211.3 | 208.7 | 202.6 | 198.6 | 185.6 | 180.1 | 97.6% | 95.5% | 91.7% | 89.2% |
| Example 4 | 210.3 | 207.1 | 201 | 197.3 | 183.5 | 178.4 | 96.7% | 93.7% | 90.6% | 88.4% |
| Example 7 | 213.5 | 209.2 | 203.2 | 199.5 | 187.3 | 182.5 | 94.5% | 92.3% | 87.1% | 83.7% |
| Example 8 | 209.5 | 206.2 | 199.9 | 196.4 | 182 | 177.9 | 96.2% | 93.2% | 89.8% | 87.9% |
| Comparative Example 1 | 195.5 | 201.2 | 192 | 188.3 | 173 | 160.7 | 92.3% | 88.7% | 83.2% | 76.7% |

As indicated in Table 2, the lithium secondary batteries of Examples 1 to 4, 7, and 8 had improved room temperature lifetime characteristic and rate performance, as compared with the lithium secondary battery of Comparative Example 1. As shown in FIG. 7, the lithium secondary battery of Example 1 had improved room temperature lifetime, as compared with the lithium secondary battery of Comparative Example 1.

Evaluation Example 4: High Temperature Cycle Characteristic

The lithium secondary batteries prepared in Examples 1 to 4, 7 and 8 and Comparative Examples 1 to 3 were each subjected to constant-current charging with a current of 0.2 C at 45° C. until the voltage reached 4.35 V, and then constant-voltage charging was performed until the current reached 0.05 C, while maintaining the voltage of 4.35 V. Subsequently, the cells were discharged with a constant current of 0.2 C until the voltage reached 3.0 V during discharging. (Formation Step)

Next, constant-current charging was performed with a current of 0.7 C until the voltage reached 4.35 V, and then constant-voltage charging was performed until the current reached 0.05 C, while maintaining the voltage of 4.35 V. Subsequently, the cells were discharged with a constant current of 0.5 C until the voltage reached 3.0 V during discharging (standard step).

The lithium secondary batteries each having undergone the formation step and the standard step were subjected to constant-current charging with a current of 0.5 C at 25° C. and 45° C. until the voltage reached 4.35 V, and then constant-voltage charging was performed until the current reached 0.05 C, while maintaining the voltage of 4.35 V. Subsequently, the cycle of discharging with a constant current of 0.5 C until the voltage reached 3.0 V during discharging was repeated 50 times.

Figure 8:
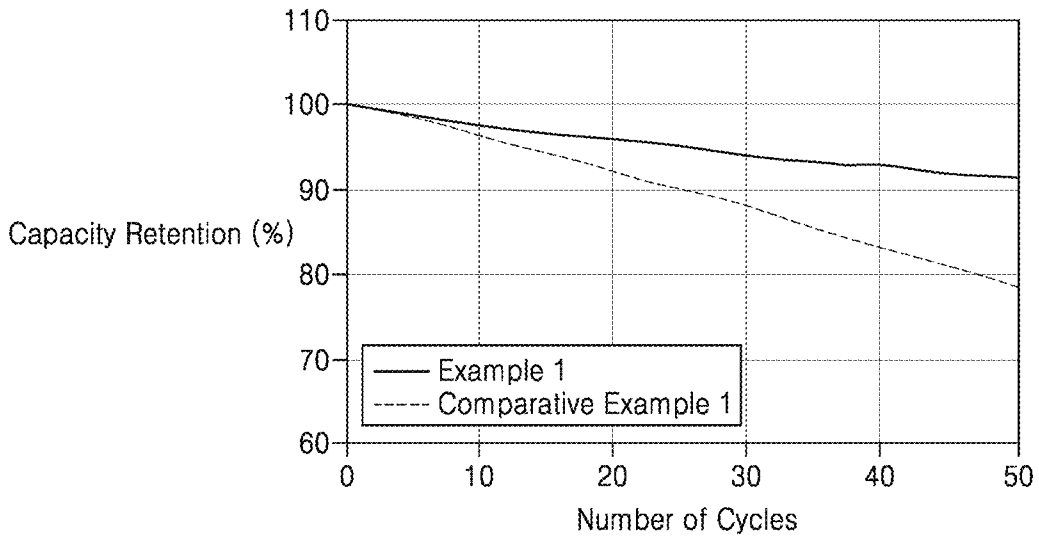
FIG. 8 shows the high-temperature lifetime characteristics of the lithium secondary batteries according to Example 1 and Comparative Example 1.

The high temperature cycle characteristics obtained from the results of the charge/discharge cycle tests are shown in FIG. 8 and Table 3.

TABLE 3

| Data | High temperature cycle life (%) |
|---|---|
| Example 1 | 91.6 |
| Example 2 | 90.8 |
| Example 3 | 93.5 |
| Example 4 | 91.8 |
| Example 7 | 90.5 |
| Example 8 | 91.2 |
| Comparative Example 1 | 82.3 |

As shown in FIG. 8 and Table 3, the lithium secondary battery of Example 1 had improved high temperature lifetime, as compared with the lithium secondary battery of Comparative Example 1. As confirmed from Table 3, the lithium secondary batteries of Examples 2 to 4, 7 and 8 each had an improved high temperature lifetime, as compared with the lithium secondary battery of Comparative Example 1.

Evaluation Example 5: Residual Lithium

The amounts of residual lithium in the nickel-based active materials prepared in Preparation Example 1 and Comparative Preparation Examples 1 and 2 were measured, and the results thereof are shown in Table 4. The residual lithium was measured by a titration method. For example, the positive electrode active material powder was dissolved in water, and then titrated with hydrochloric acid to obtain the amounts of LiOH and $Li_2CO_3$ contained in the nickel-based active material powder. Based on the obtained amounts, the amounts of LiOH and $Li_2CO_3$ remaining on the surface of the positive electrode active materials were calculated.

TABLE 4

| Data | Amount of $Li_2CO_3$ (wt %) | Amount of LiOH (wt %) | Amount of residual lithium (ppm) |
|---|---|---|---|
| Preparation Example 1 | 0.779 | 0.429 | 2708 |
| Comparative Preparation Example 1 | 0.883 | 0.612 | 3436 |

Referring to Table 4, it was confirmed that the nickel-based active material of Preparation Example 1 had a reduced amount of LiOH, as compared with the nickel-based active material of Comparative Preparation Example 1.

Evaluation Example 6: Pellet Density

A pellet density (PD) of each of the positive electrode active materials of Examples 1 to 4, 7, and 8 and the positive electrode active material of Comparative Example 1 was analyzed and the results are shown in Table 5.

TABLE 5

| Data | Pellet density (PD) (g/cc) |
|---|---|
| Example 1 | 3.55 |
| Example 2 | 3.52 |
| Example 3 | 3.17 |
| Example 4 | 3.34 |
| Example 7 | 3.63 |
| Example 8 | 3.48 |
| Comparative Example 1 | 3.28 |

As confirmed from Table 5, the positive electrode active materials of Examples 1, 2, 4, 7 and 8 demonstrated increased pellet densities, as compared with the positive electrode active material of Comparative Example 1. Although the positive electrode active material of Example 3 had a smaller pellet density than the positive electrode active material of Comparative Example 1, a lithium secondary battery including a positive electrode utilizing the positive electrode active material of Example 3 had considerably improved room temperature and high temperature lifetime, compared to the lithium secondary battery including a positive electrode utilizing the positive electrode active material of Comparative Example 1.

The nickel-based active material according to the present disclosure allows an electrochemical reaction to become substantially uniform while having excellent capacity characteristics, and thus gas generation may be inhibited by utilizing the nickel-based active material. The lithium secondary battery including a positive electrode containing the nickel-based active material may have improved cycle life characteristics.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, or 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that the embodiments described herein should be considered in a descriptive sense only and not for purposes of limitation. Descriptions of features or aspects within each embodiment should typically be considered as being available for other similar features or aspects in other embodiments. While one or more embodiments have been described with reference to the drawings, it will be understood by those of ordinary skill in the art that various changes in form and details may be made therein without departing from the spirit and scope of the disclosure as defined by the following claims and equivalents thereof.

What is claimed is:

1. A positive electrode comprising a positive active material layer comprising a nickel-based active material having 80 mol % or more of nickel with respect to 100 mol % of total metal elements of the nickel-based active material excluding lithium, the nickel-based active material comprising:

i) large secondary particles having a size in a range of 10 μm to 20 μm and each comprising an aggregate of primary particles having a size of 1 μm or less;

ii) large crystal particles comprising primary particles having a size in a range of 1 μm to 5 μm; and iii) small secondary particles having a size in a range of 1 μm to 7 μm and each comprising an aggregate of primary particles having a size of 1 μm or less, wherein the large secondary particles have a higher percentage of nickel compared to a percentage of nickel in the large crystal particles and compared to a percentage of nickel in the small secondary particles, wherein an amount of the large secondary particles is higher than an amount of the small secondary particles, wherein an amount of the large crystal particles is at most the amount of the small secondary particles, and wherein a mixture density of the positive active material layer is 4.0 g/cm$^3$ or greater.

2. The positive electrode of claim 1, wherein the large crystal particles are each a one body particle or each have a monolithic structure.

3. The positive electrode of claim 1, wherein the large crystal particles are secondary particles that are aggregates of primary particles, and the secondary particles have a size of 1 μm to 9 μm.

4. The positive electrode of claim 1, wherein an amount of nickel in the large crystal particles is greater than an amount of nickel in the small secondary particles.

5. The positive electrode of claim 1, wherein an amount of nickel in the large secondary particles is 90 mol % to 99 mol % based on 100 mol % of the total metal elements of the nickel-based active material excluding lithium.

6. The positive electrode of claim 1, wherein an amount of nickel in the large crystal particles is 80 mol % to 95 mol % based on 100 mol % of the total metal elements of the nickel-based active material excluding lithium.

7. The positive electrode of claim 1, wherein an amount of nickel in the small secondary particles is 80 mol % to 95 mol % based on 100 mol % of the total metal elements of the nickel-based active material excluding lithium.

8. A nickel-based active material having 80 mol % or more of nickel with respect to 100 mol % of total metal elements of the nickel-based active material excluding lithium, the nickel-based active material comprising:

i) large secondary particles having a size in a range of 10 μm to 20 μm and each comprising an aggregate of primary particles having a size of 1 μm or less;

ii) large crystal particles comprising primary particles having a size in a range of 1 μm to 5 μm; and iii) small secondary particles having a size in a range of 1 μm to 7 μm and each comprising an aggregate of primary particles having a size of 1 μm or less, wherein an amount of the large crystal particles is 5 wt % to 25 wt % based on a total amount of 100 wt % of the large secondary particles, the large crystal particles, and the small secondary particles, an amount of the small secondary particles is 5 wt % to 25 wt % based on the total amount of 100 wt % of the large secondary particles, the large crystal particles, and the small secondary particles, and an amount of the large secondary particles is higher than the amount of the large crystal particles and the amount of the small secondary particles.

9. The positive electrode of claim 1, wherein:

the nickel-based active material is a compound represented by Formula 1, a compound represented by Formula 2, or a combination thereof:

$$Li_xNi_{1-y}CO_yO_{2-z}X_z, \quad \text{Formula 1}$$

wherein, in Formula 1, $0.9 \le x \le 1.2$, $0<y \le 0.2$, $0 \le z \le 0.5$, and $0.8 \le 1-y<1$ are satisfied, and X is F, S, P, or a combination thereof, and $$Li_xNi_{1-y-z}CO_yM_zO_{2-a}X_a, \quad \text{Formula 2}$$

wherein, in Formula 2, $0.9 \le x \le 1.2$, $0<y<0.5$, $0.8 \le 1-y-z<1$, $0 \le z \le 0.5$, $0<y+z \le 0.2$, and $0 \le a<2$ are satisfied, M is Ni, Co, Mn, Mg, Ca, Sr, Ba, Ti, Zr, Nb, Mo, W, Zn, Al, Si, Cr, Fe, V, a rare earth element, or a combination thereof, and X is F, S, P, or a combination thereof.

10. The positive electrode of claim 1, wherein:

the nickel-based active material is a compound represented by Formula 3, a compound represented by Formula 4, or a combination thereof:

$$Li_xCo_aNi_bMn_cO_2, \quad \text{Formula 3}$$

wherein, in Formula 3, $0.9<x<1.2$, $0<a<0.5$, $0.8 \le b<1$, $0<c<0.5$, and $a+b+c=1$ are satisfied, and $$Li_xCo_aNi_bAl_cO_2, \quad \text{Formula 4}$$

wherein, in Formula 4, $0.9<x<1.2$, $0<a<0.5$, $0.8 \le b<1$, $0<c<0.5$, and $a+b+c=1$ are satisfied.

11. The positive electrode of claim 1, wherein:

in an X-ray diffraction analysis of the nickel-based active material, a full width at half maximum (FWHM) of a (003) plane peak is 0.120 degrees (°) to 0.270°, a FWHM of a (104) plane peak is 0.120° to 0.270°, and a distance between a (108) plane peak and a (110) plane peak is 0.1° to 0.5°.

12. A lithium secondary battery comprising the positive electrode of claim 1, a negative electrode, and an electrolyte therebetween.

13. The positive electrode of claim 1, wherein:

an amount of nickel in the large secondary particles is 90 mol % to 99 mol % based on 100 mol % of the total metal elements of the nickel-based active material excluding lithium, and an amount of nickel in the large crystal particles is 80 mol % to 95 mol % based on 100 mol % of the total metal elements of the nickel-based active material excluding lithium.

14. The positive electrode of claim 1, wherein, in an X-ray diffraction analysis of the nickel-based active material, a full width at half maximum (FWHM) for a (003) plane peak is 0.120 degrees (°) to 0.270°.

15. The positive electrode of claim 14, wherein, in the X-ray diffraction analysis of the nickel-based active material, the full width at half maximum (FWHM) for the (003) plane peak is 0.120° to 0.150°.

16. The positive electrode of claim 1, wherein a difference in the percentage of nickel between the large secondary particles and the large crystal particles and a difference in the percentage of nickel between the large secondary particles and the small secondary particles are each 19 mol % or less.

17. The nickel-based active material of claim 8, wherein the amount of the large crystal particles is at most the amount of the small secondary particles.

* * * * *